United States Patent
Imamura et al.

(10) Patent No.: US 8,279,592 B2
(45) Date of Patent: Oct. 2, 2012

(54) ELECTRONIC DEVICE

(75) Inventors: Akira Imamura, Hamura (JP); Toshikatsu Nakamura, Akishima (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 12/973,473

(22) Filed: Dec. 20, 2010

(65) Prior Publication Data

US 2011/0285647 A1    Nov. 24, 2011

(30) Foreign Application Priority Data

May 21, 2010  (JP) ................. 2010-117603

(51) Int. Cl.
G06F 1/16 (2006.01)
H05K 5/00 (2006.01)
H05K 7/00 (2006.01)

(52) U.S. Cl. ......... 361/679.27; 361/679.02; 361/679.26; 361/814

(58) Field of Classification Search .......... 361/683–688, 361/752–753, 814, 679.01–679.27
See application file for complete search history.

(56) References Cited

U.S. PATENT DOCUMENTS

| | | | |
|---|---|---|---|
| 2003/0236102 A1 | 12/2003 | Kawai et al. | |
| 2004/0207568 A1 | 10/2004 | Ooshima et al. | |
| 2004/0264118 A1* | 12/2004 | Karidis et al. | 361/683 |
| 2007/0242421 A1* | 10/2007 | Goschin et al. | 361/681 |
| 2008/0047413 A1* | 2/2008 | Laycock et al. | 84/477 R |
| 2008/0106859 A1 | 5/2008 | Eguchi et al. | |
| 2009/0059497 A1* | 3/2009 | Kuwahara et al. | 361/681 |

FOREIGN PATENT DOCUMENTS

| | | |
|---|---|---|
| JP | H09-305259 | 11/1997 |
| JP | 2000-010655 | 1/2000 |
| JP | 2000-174527 | 6/2000 |
| JP | 2001-005438 | 1/2001 |
| JP | 2003-196012 A | 7/2003 |
| JP | 2003-204380 | 7/2003 |
| JP | 2003-233454 A | 8/2003 |
| JP | 2003-280767 | 10/2003 |
| JP | 2004-021862 | 1/2004 |
| JP | 2004-302179 | 10/2004 |
| JP | 2005-115536 A | 4/2005 |
| JP | 2006-174506 | 6/2006 |
| JP | 2006-347478 A | 12/2006 |
| JP | 2009-233338 A | 10/2009 |
| JP | 2010-003062 | 1/2010 |

(Continued)

OTHER PUBLICATIONS

Notice of Reasons for Rejection mailed by Japan Patent Office on Feb. 1, 2011 in the corresponding Japanese patent application No. 2010-117603.

(Continued)

Primary Examiner — Tuan T Dinh
(74) Attorney, Agent, or Firm — Knobbe, Martens Olson & Bear LLP

(57) ABSTRACT

According to one embodiment, an electronic device includes a first main unit having a surface thereof provided with a display panel, a second main unit having a surface thereof provided with another display panel, a hinge mechanism coupling the first and second main units, and two operation buttons arranged symmetrical with respect to a center line passing through the respective centers of the first and second main units.

13 Claims, 18 Drawing Sheets

FOREIGN PATENT DOCUMENTS

| | | |
|---|---|---|
| JP | 2010-086513 | 4/2010 |
| WO | WO 03/058422 A1 | 7/2003 |
| WO | WO 2005/029296 | 3/2005 |
| WO | WO 2006/093074 A1 | 9/2006 |

OTHER PUBLICATIONS

Notice of Reasons for Rejection mailed by Japan Patent Office on Mar. 29, 2011 in the corresponding Japanese patent application No. 2010-117603.

Notice of Reasons for Rejection mailed by Japan Patent Office on Jun. 28, 2011 in the corresponding Japanese patent application No. 2011-117069.

Notice of Reasons for Rejection mailed by Japan Patent Office on Jun. 28, 2011 in the corresponding Japanese patent application No. 2010-117070.

Notice of Reasons for Rejection mailed by the Japan Patent Office on Nov. 15, 2011 in corresponding Japanese patent app. No. 2011-214533, a divisional of JP 2010-117603, in 10 pages.

* cited by examiner

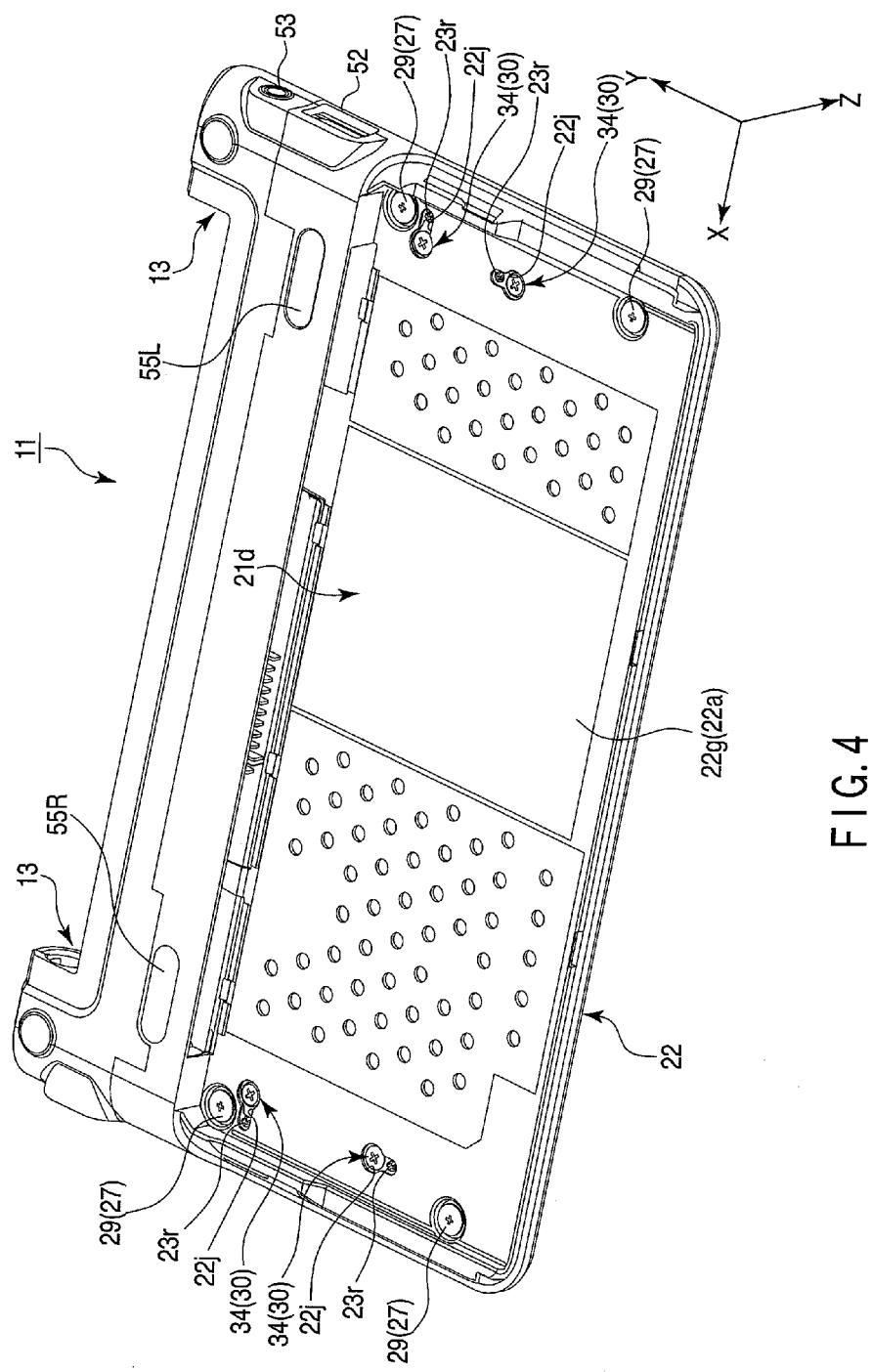
F I G. 4

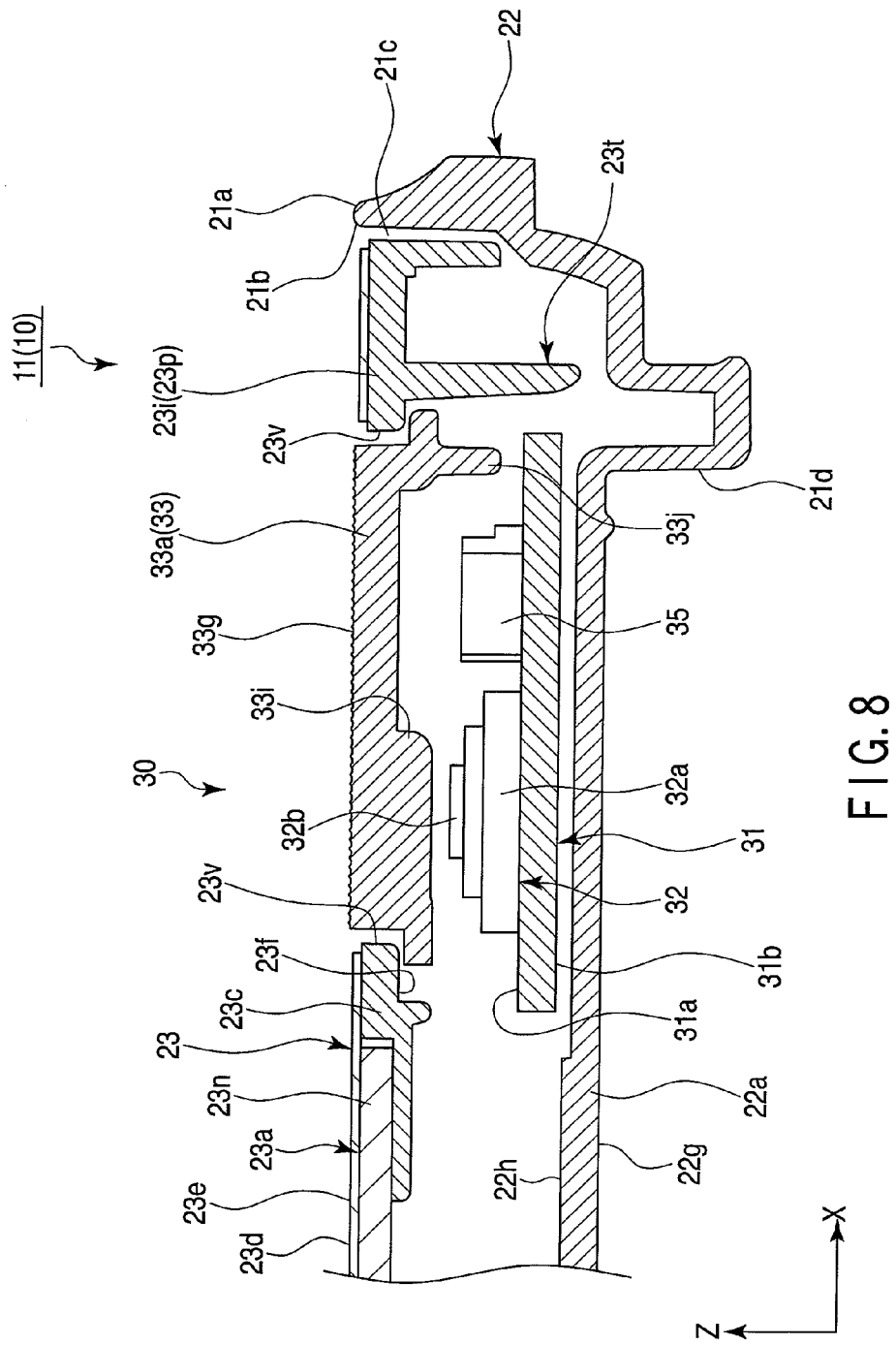
F I G. 8

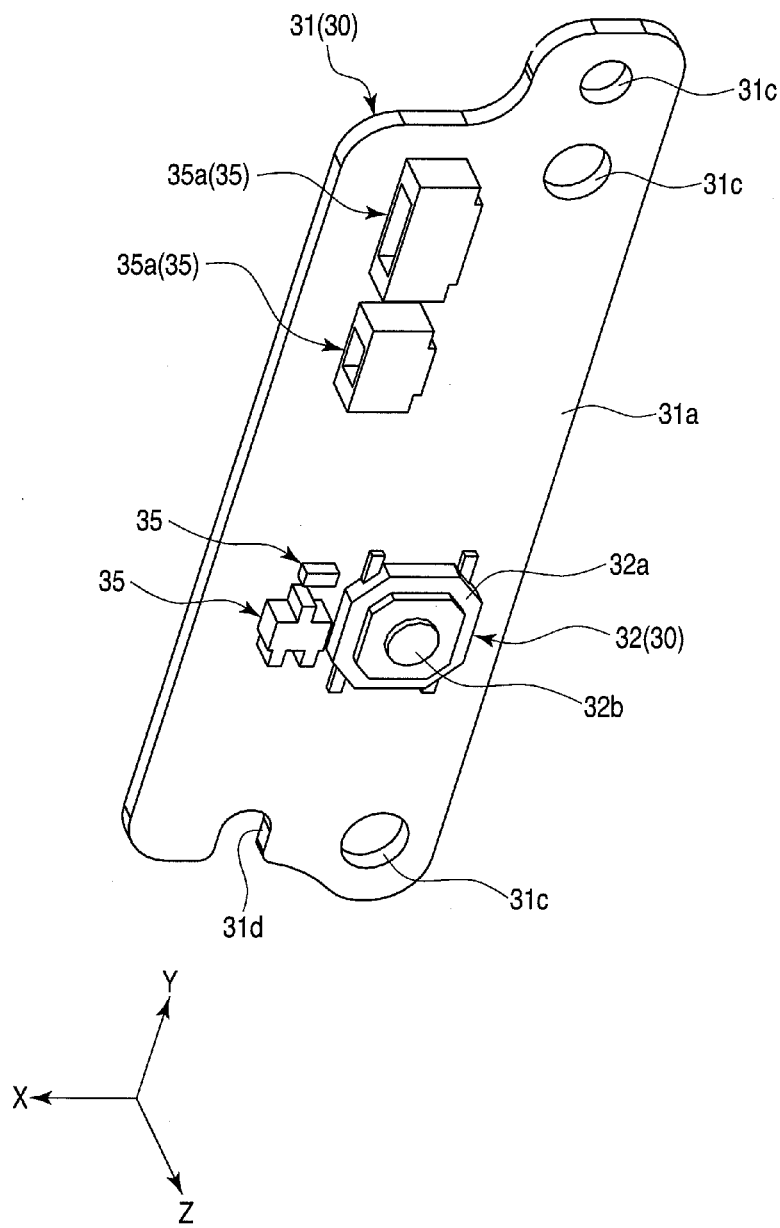
F I G. 9

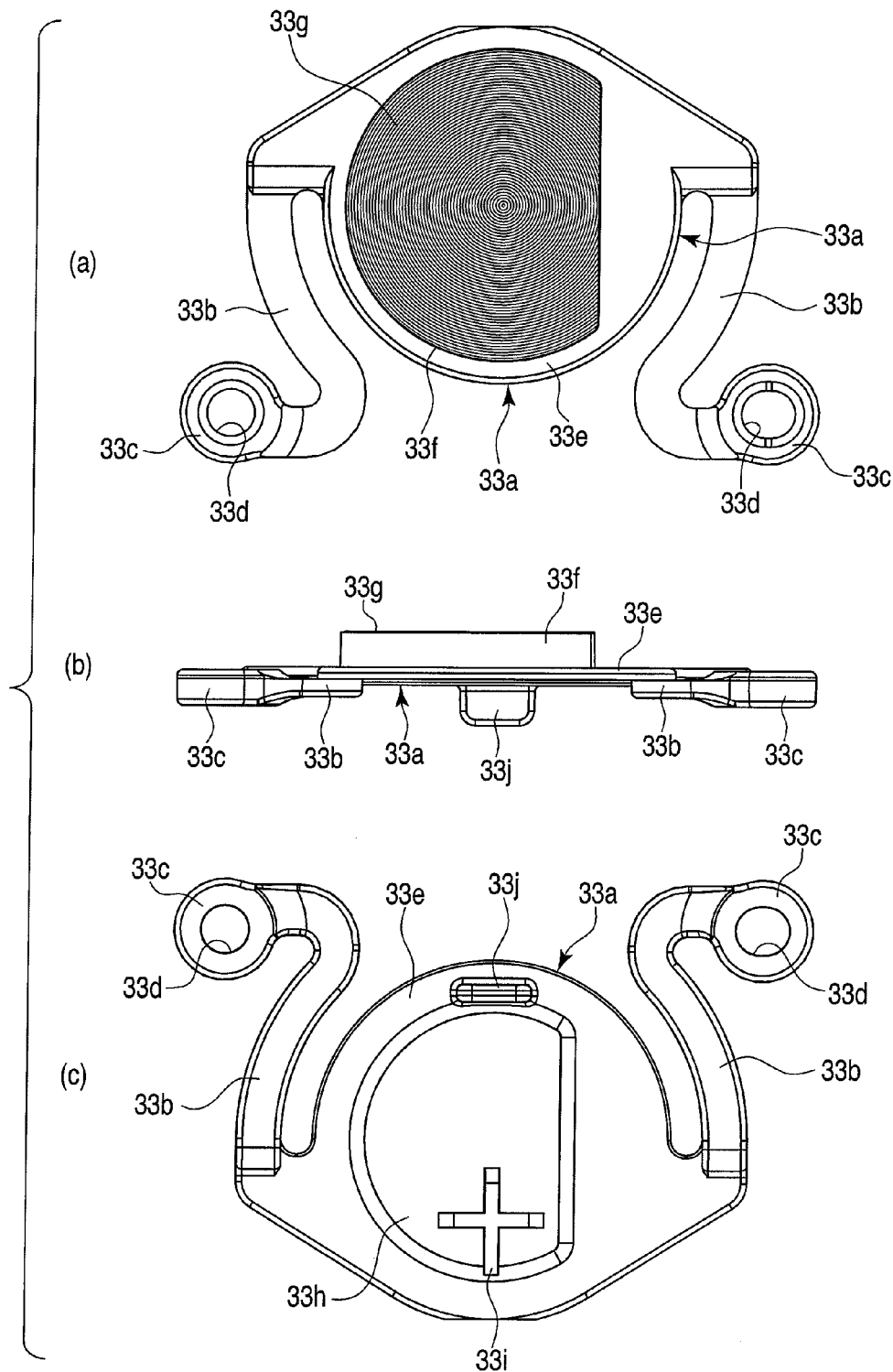
F I G. 11

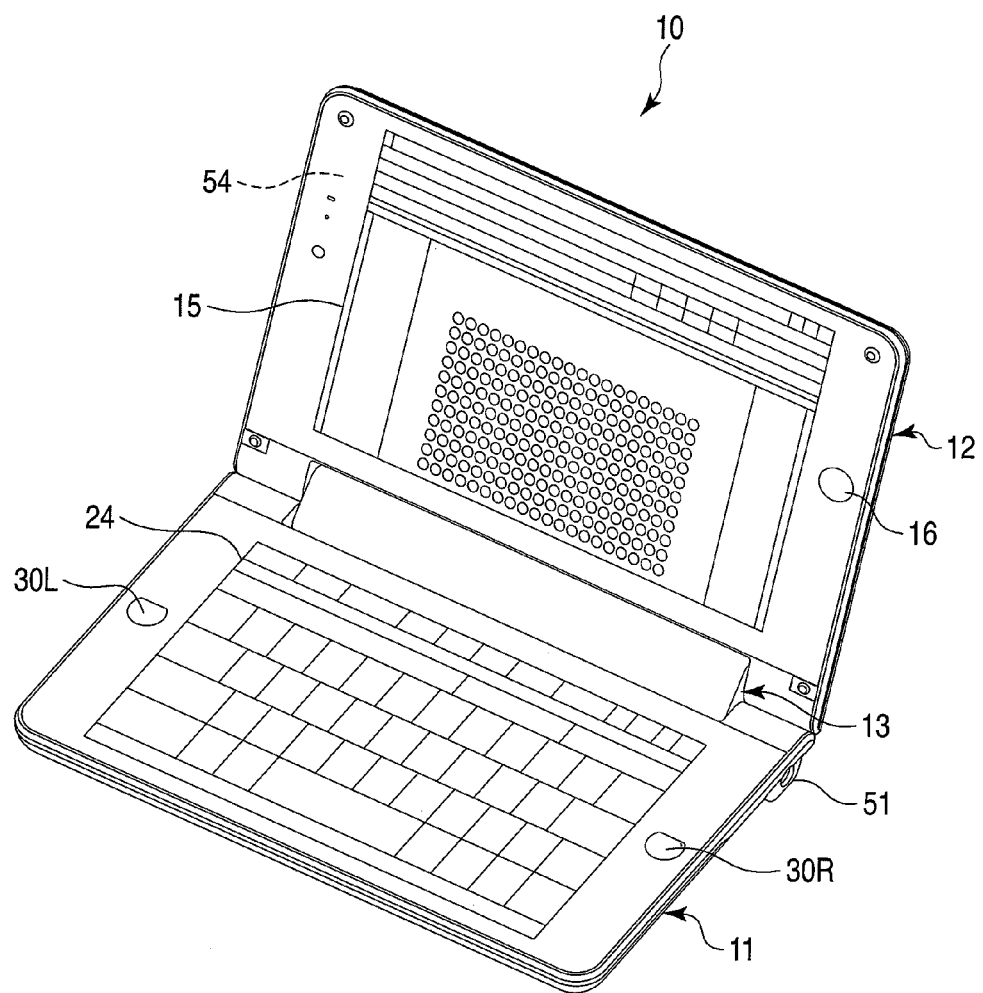
F I G. 15

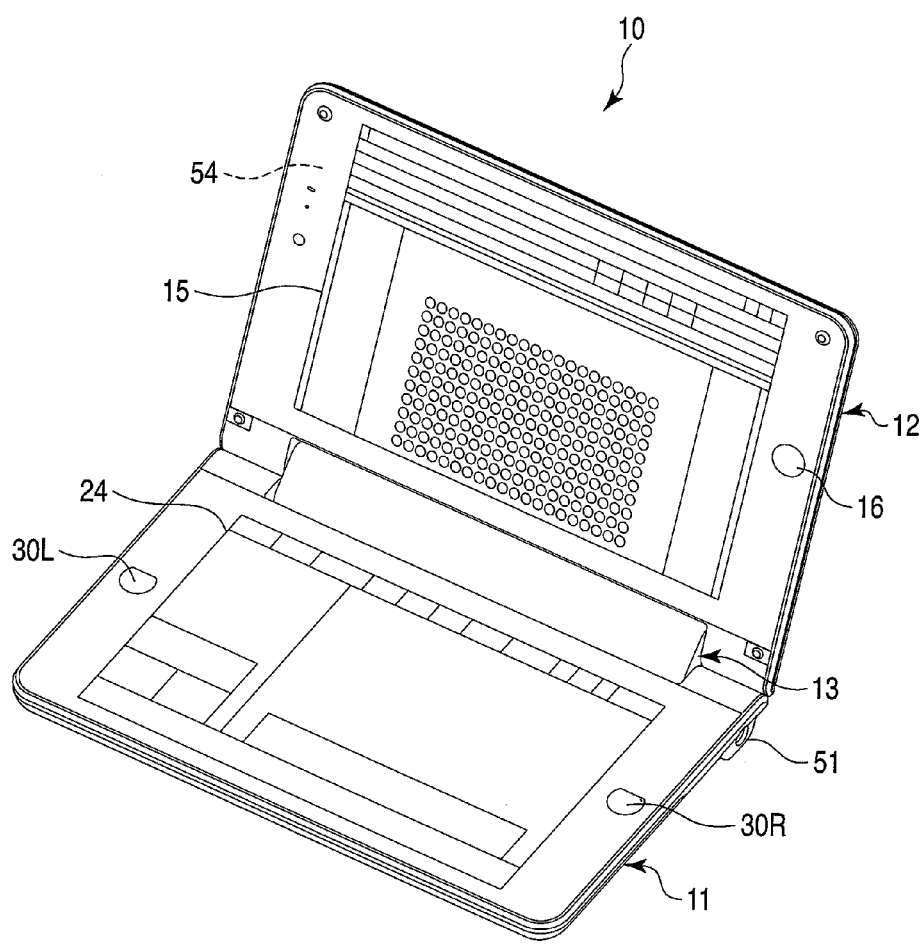
F I G. 16

ELECTRONIC DEVICE

CROSS-REFERENCE TO RELATED APPLICATIONS

This application is based upon and claims the benefit of priority from Japanese Patent Application No. 2010-117603, filed May 21, 2010; the entire contents of which are incorporated herein by reference.

FIELD

Embodiments described herein relate generally to an electronic device having two screens.

BACKGROUND

Electronic devices with a touch panel for permitting users to touch so as to execute various input operations are known. In particular, electronic devices such as personal digital assistants (PDAs) are now developed, which comprise a first housing provided with a touch panel, and a second housing provided with another screen and rotatably coupled to the former via a hinge.

By thus displaying various types of information on the two screens, a greater amount of information can be simultaneously displayed and desired input operations can be executed simultaneously. Further, by folding the two housings to stack the two screens, the electronic device can be made compact and convenient for carrying.

When using an electronic device having two screens, the first and second housings may be held by the right and left hands, respectively, to keep the two screens horizontally. Alternatively, the first housing may be placed on, for example, a desk, and the second housing be obliquely open. Namely, the electronic device may be used like a note PC.

In any case, in the electronic devices with two screens, it is desirable to balance the weights of the front, rear, right and left portions, and to design them to a symmetrical appearance.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is a perspective view illustrating the reverse side of the first main unit, from which side a battery pack is detached;

FIG. 8 is a sectional view taken along line VIII-VIII in FIG. 1;

FIG. 9 is a perspective view illustrating each operation mechanism support member of the electronic device of FIG. 1 viewed from the front;

Figure 1:
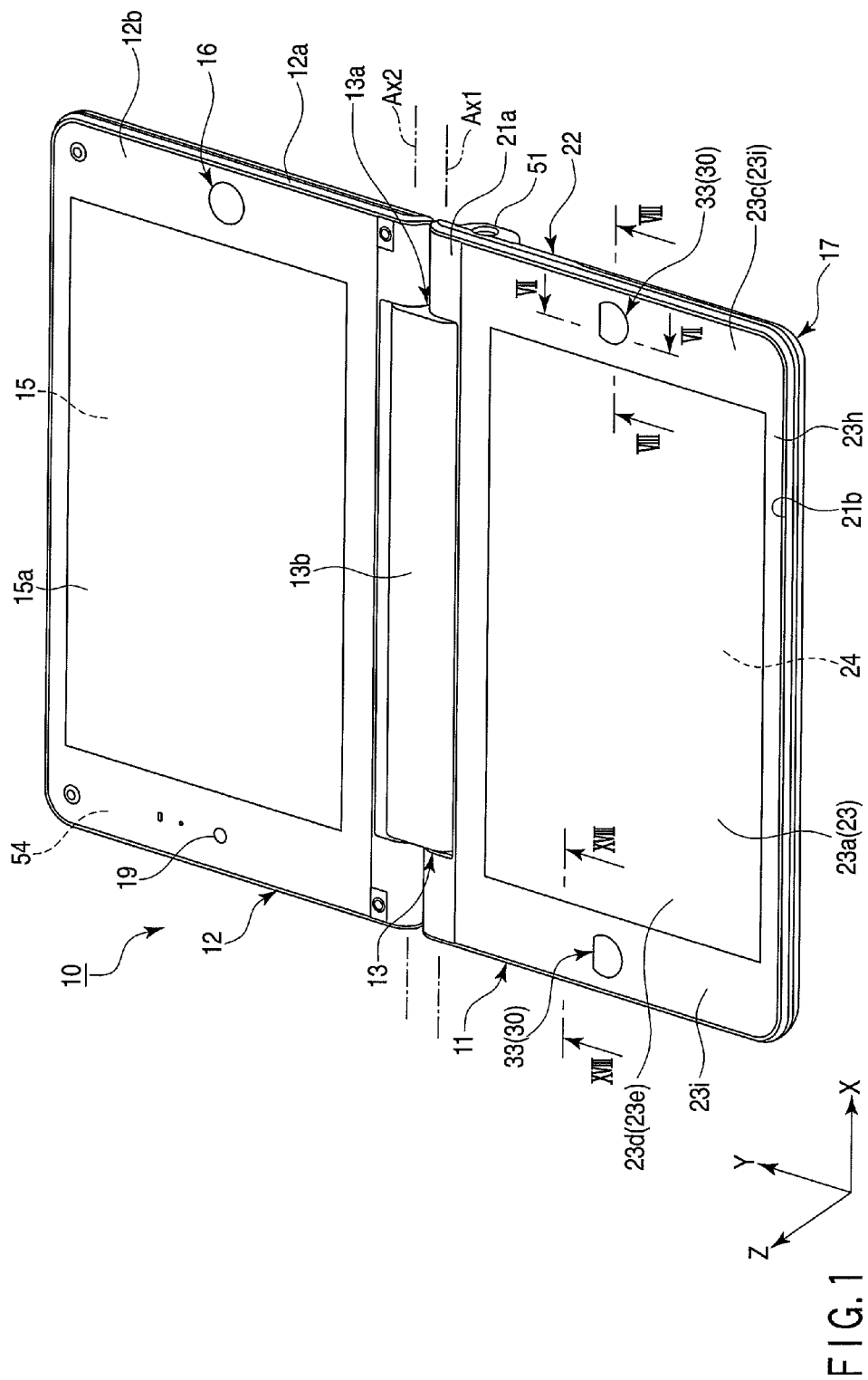
FIG. 1 is a perspective view illustrating an example of an electronic device according to an embodiment.
Figure 10:
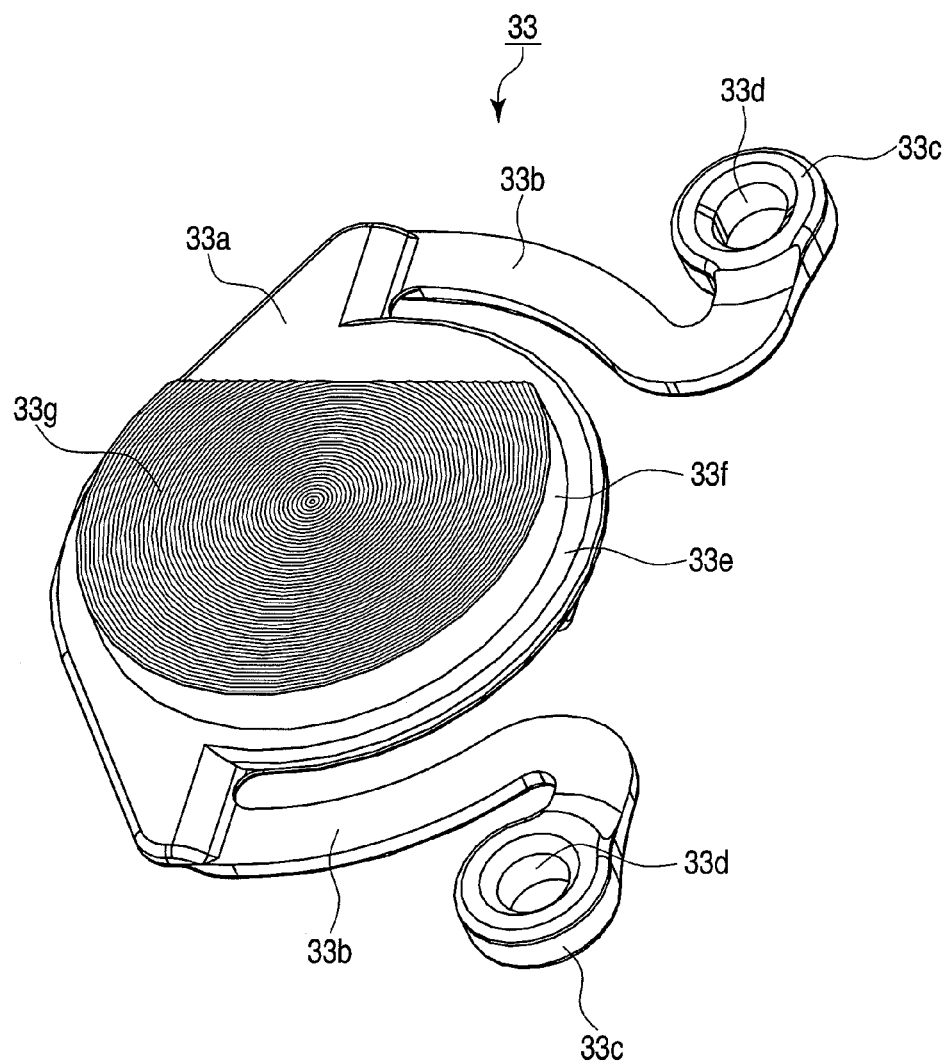
FIG. 10 is a perspective view illustrating a cover member for covering the operation mechanism of the electronic device of FIG. 1.
Figure 12:
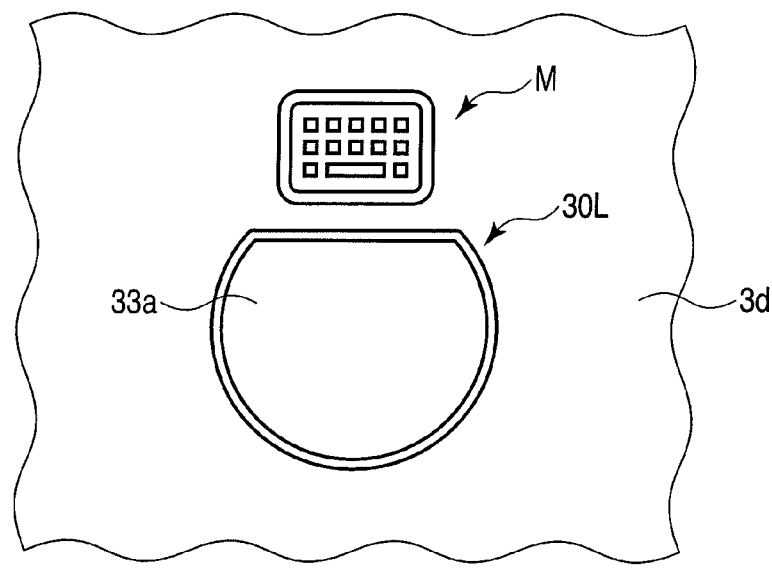
Figure 13:
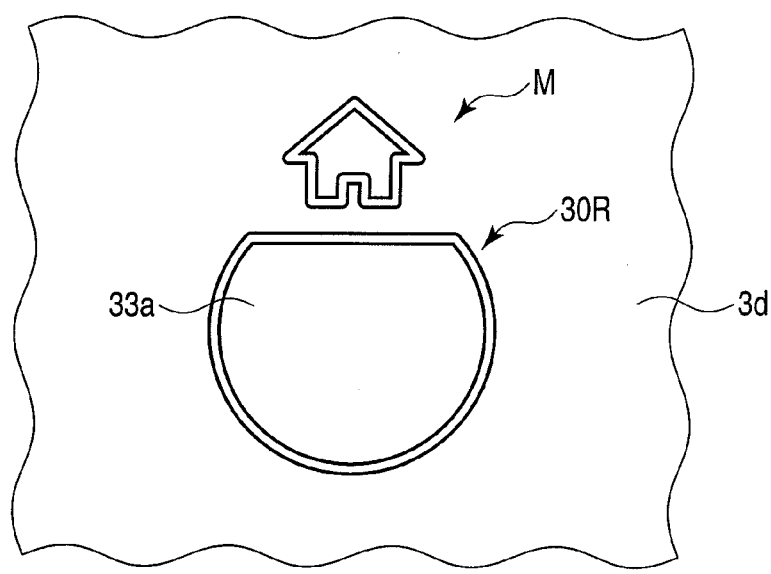
Figure 14:
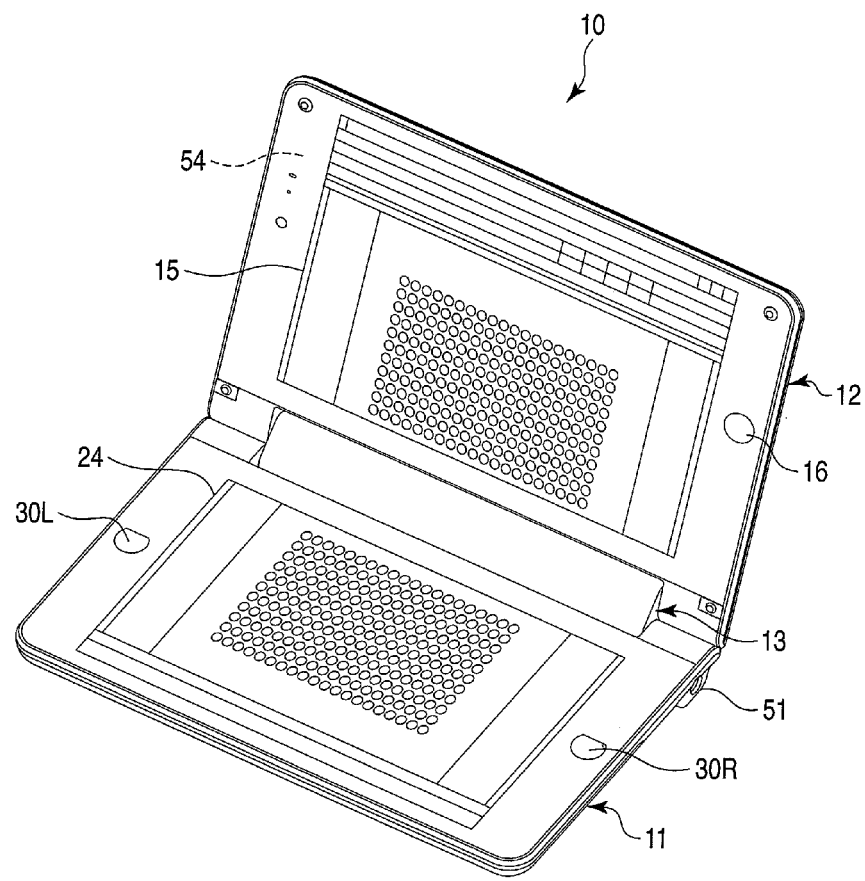
Figure 17:
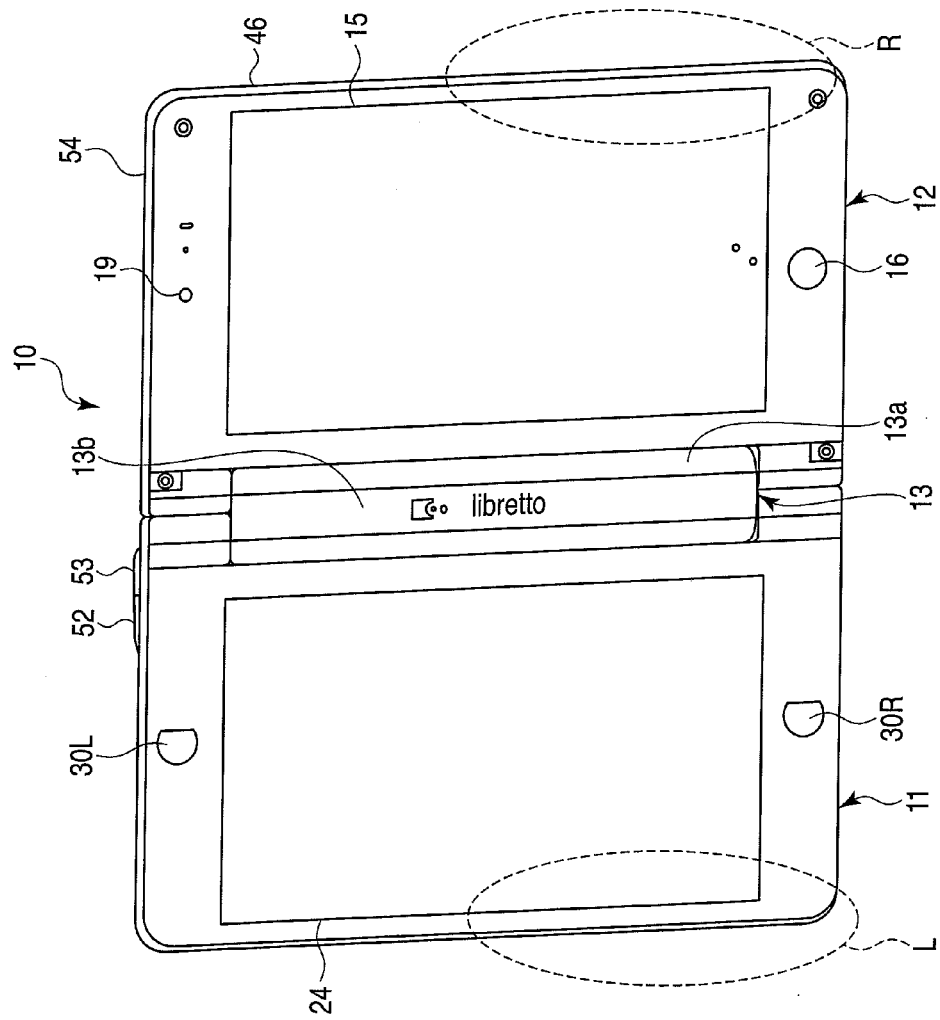
Figure 18:
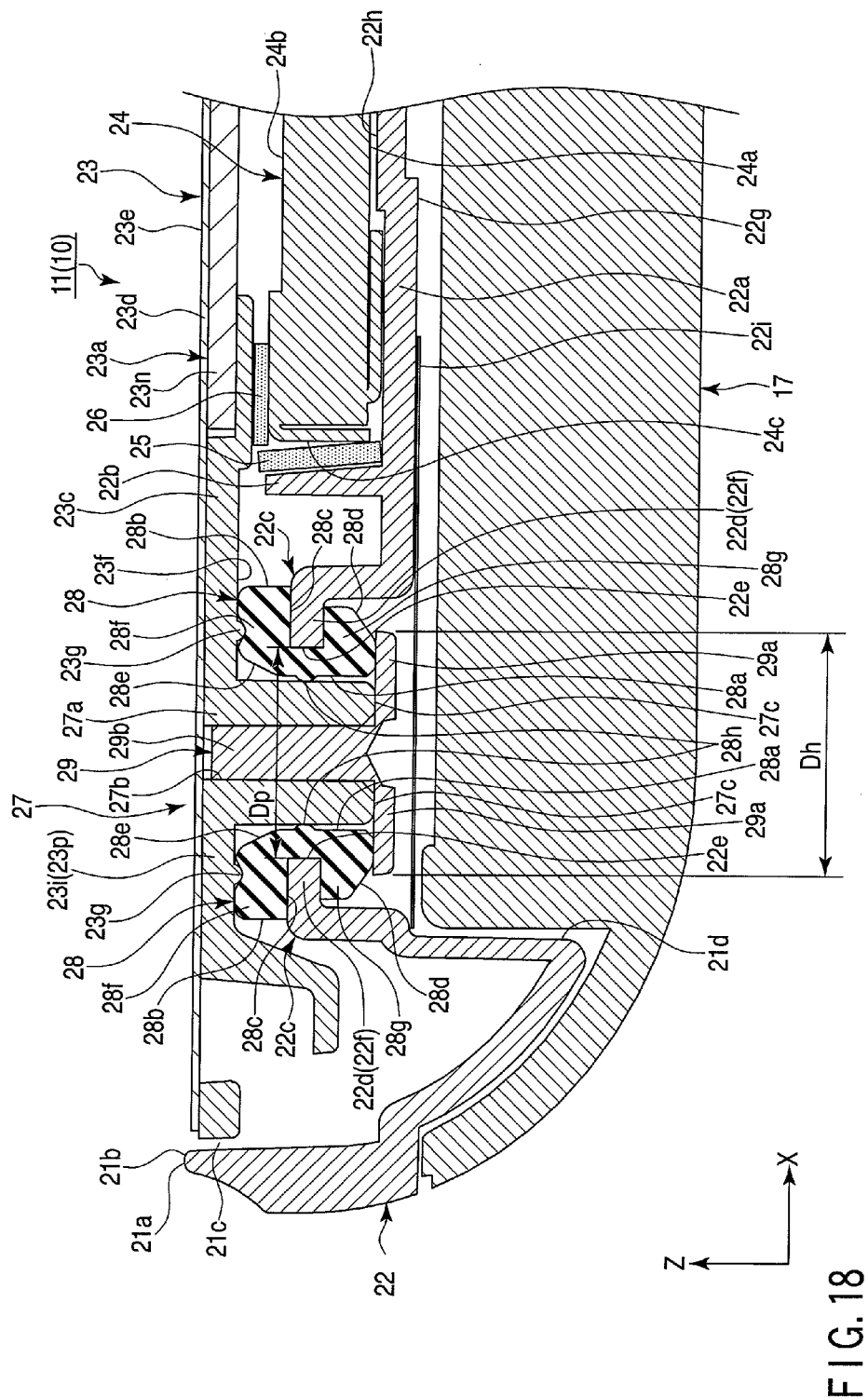

(a) of FIG. 11 shows the top of cover member of FIG. 10, (b) of FIG. 11 shows a side of the cover member, and (c) of FIG. 11 shows the bottom of the cover member;

FIG. 12 is a view illustrating a left-hand operation button provided on the first main unit of the electronic device of FIG. 1;

FIG. 13 is a view illustrating a right-hand operation button provided on the first main unit of the electronic device of FIG. 1;

FIG. 14 is a perspective view illustrating a state in which the electronic device of FIG. 1 is used with one display panel thereof above the other, and one image is displayed on the two panels;

FIG. 15 is a perspective view illustrating a state in which a keyboard is displayed on the display panel of the first main unit shown in FIG. 14;

FIG. 16 is a perspective view illustrating a state in which a mouse pad is displayed on the display panel of the first main unit shown in FIG. 14;

FIG. 17 is a perspective view illustrating a state in which the two display panels of the electronic device of FIG. 1 are used side by side;

FIG. 18 is a sectional view taken along line XVIII-XVIII of FIG. 1; and

Figure 19:
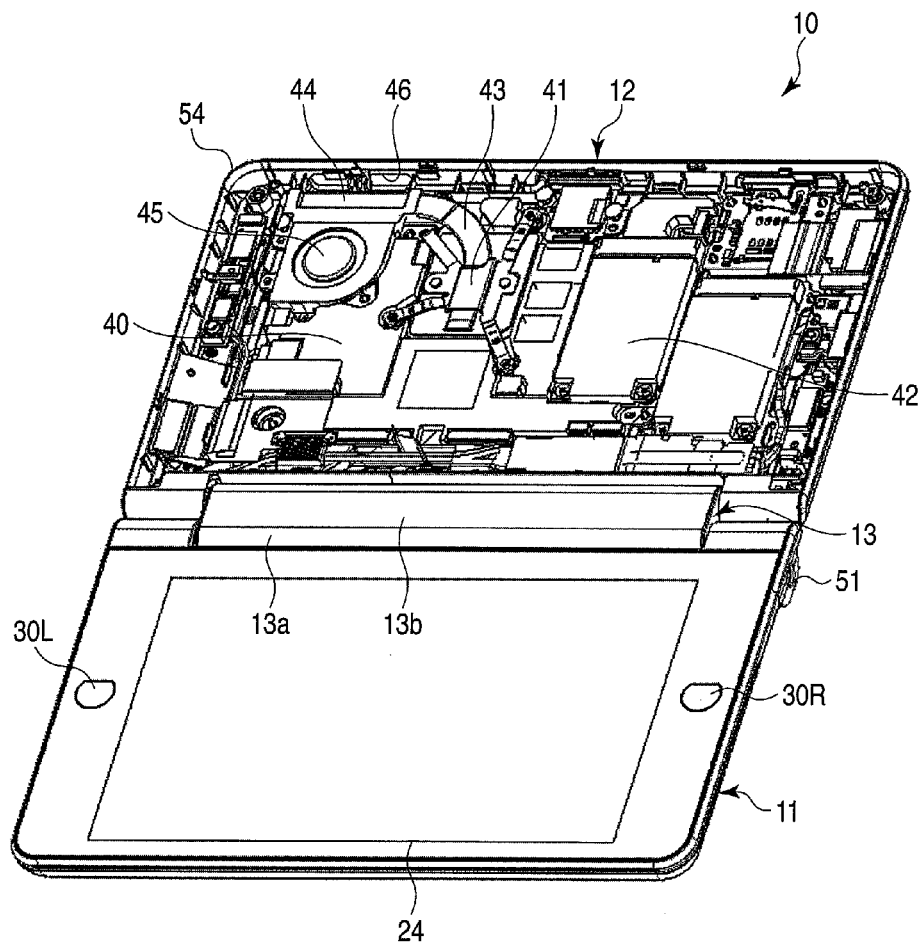

FIG. 19 is a perspective view illustrating the internal structure of the second main unit of the electronic device shown in FIG. 1.

DETAILED DESCRIPTION

An embodiment will be described hereinafter with reference to the accompanying drawings.

In general, according to the embodiment, an electronic device 10 comprises a first main unit 11 having a surface thereof provided with a display panel 24, a second main unit 12 having a surface thereof provided with a display panel 15, a hinge mechanism 13 coupling the first and second main units 11 and 12, and two operation buttons 30 arranged symmetrical with respect to a center line C (see FIGS. 5 and 6) passing through the respective centers of the first and second main units 11, 12.

As shown in FIG. 1, the electronic device 10 of the embodiment is formed as a so-called note PC, and comprises the first flat rectangular main unit 11, and the second flat rectangular main unit 12. The first and second main units 11 and 12 are coupled by the hinge mechanism 13 so that they can relatively rotate between the developed state shown in FIG. 1 and the folded state shown in FIG. 2.

Figure 2:
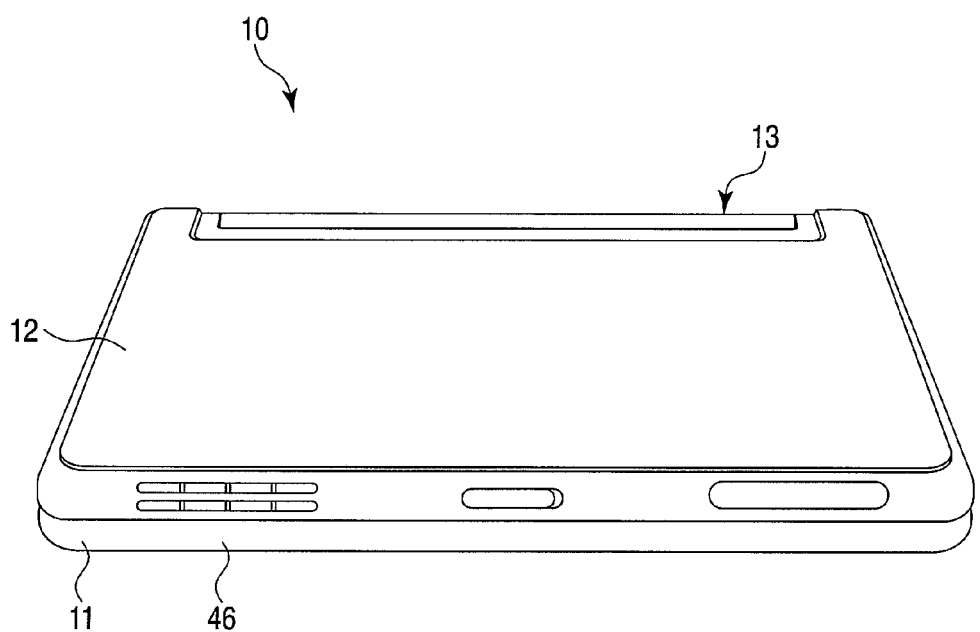
FIG. 2 is a perspective view illustrating a state in which the electronic device of FIG. 1 is closed.

The hinge mechanism 13 is a biaxial hinge having two parallel rotation axes Ax1 and Ax2. The first main unit 11 is attached to the hinge mechanism 13 so that it can rotate about the rotation axis Ax1, and the second main unit 12 is attached to the hinge mechanism 13 so that it can rotate about the rotation axis Ax2. The hinge mechanism 13 includes an intermediate part 13a with a flat surface 13b, and has a function of rotating the first and second main units 11 and 12 always at the same angle with respect to the flat surface 13b. Accordingly, the distance between the first and second main units 11 and 12 is always kept constant, i.e., no undesirable gap is formed therebetween. Further, for example, letters (see FIG. 17) written on the surface 13b of the intermediate part 13a can be seen immediately before the first and second main units 11 and 12 are closed as shown in FIG. 2.

In the embodiment, for facilitating the description, X-, Y- and Z-axes are defined. The X- and Y-axes are substantially included in the plane of the surface of the first main unit 11. The X-axis is parallel to the width of the first main unit 11. The Y-axis is parallel to the depth of the first main unit 11. The Z-axis is perpendicular to the surface of the first main unit 11. The X-, Y- and Z-axes are perpendicular to each other.

As shown in FIG. 1, the first main unit 11 comprises the display panel 24 (first screen), such as an LCD, provided with a touch panel 23*a* and a pair of push button mechanisms 30, which are exposed to the surface 21*a* of a housing 22. The second main unit 12 comprises the display panel 15 (second screen), such as an LCD, provided with a touch panel 15*a*, a power button 16, a camera lens 19, etc., which are exposed to the surface 12*b* of a housing 12*a*. Although in the embodiment, the touch panels 23*a* and 15*a* are provided at both the first and second main units 11 and 12, respectively, only the touch panel 23*a* may be provided at the first main unit 11.

In the developed state shown in FIG. 1, the display panel 15 with the touch panel 15*a*, the display panel 24 with the touch panel 23*a*, the two button mechanisms 30, cover members 33 for covering the mechanisms, the power button 16, the camera lens 19, etc., are exposed, which permits a user to use. In the folded state shown in FIG. 2, the surfaces 21*a* and 12*b* are opposed to each other with a slight clearance therebetween, whereby the display panel 15 with the touch panel 15*a*, the display panel 24 with the touch panel 23*a*, the two button mechanisms 30, the cover members 33 for covering the mechanisms, the power button 16, the camera lens 19, etc., are hidden by the housings 22 and 12*a*. In this state, the electronic device 10 is compact and easy to carry.

Figure 3:
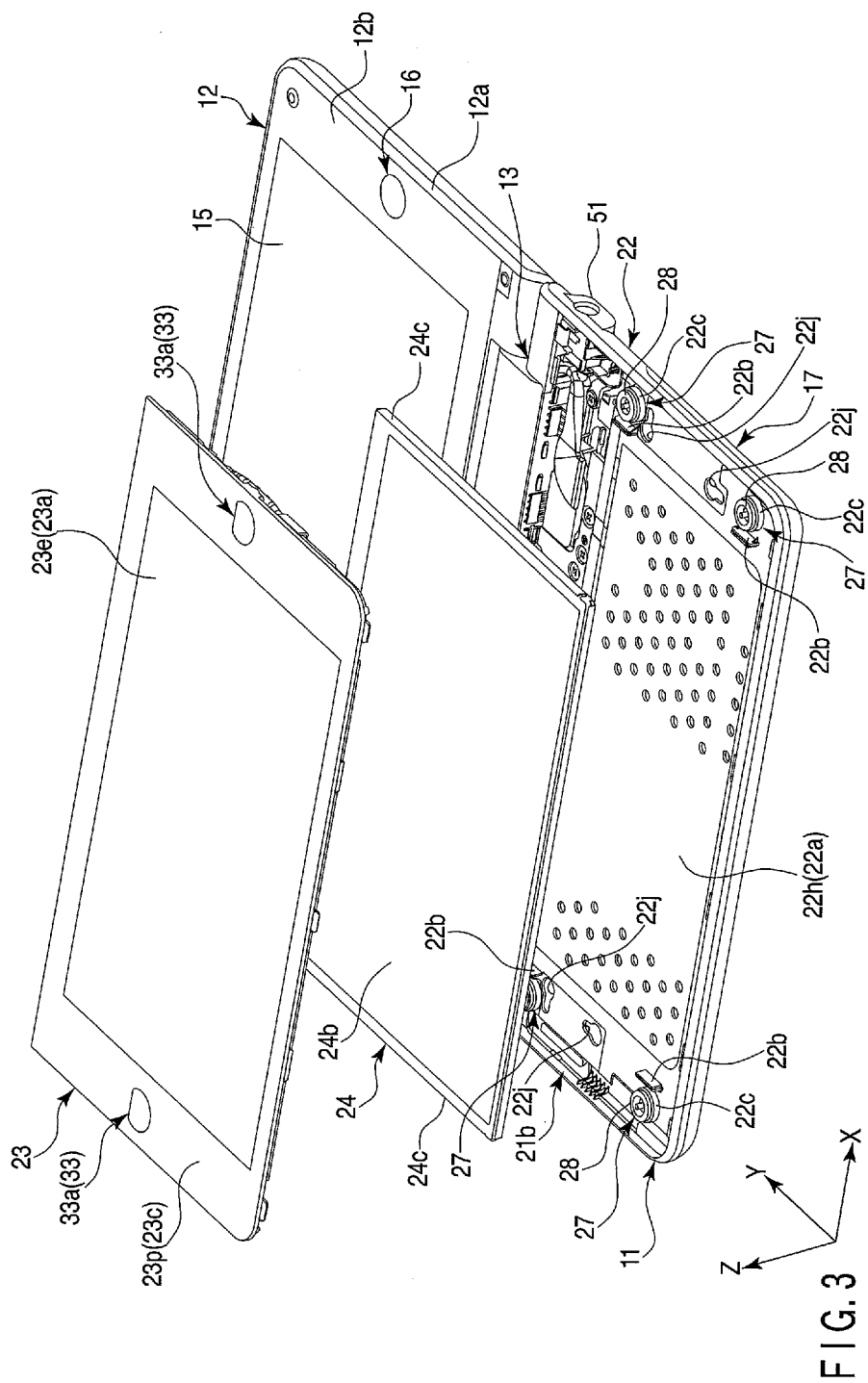
FIG. 3 is an exploded perspective view illustrating a first main unit incorporated in the electronic device of FIG. 1.

As shown in FIG. 3, in the embodiment, the display panel 24 is provided on the bottom 22*a* of the housing 22 of the first main unit 11, and the touch panel unit 23 is provided on the display panel 24. In addition, a battery pack 17, described later, is detachably attached to the back side of the first main unit 11. In the embodiment, the front and back sides of the display panel 24 are positioned along the Z-axis. Namely, the front and back sides of the display panel 24 are positioned vertically in FIGS. 1 and 3.

Further, as shown in FIG. 19, the housing 12*a* of the second main unit 12 houses various component parts, such as a system board with a CPU 41 and an SSD 42 mounted thereon, a fan 45 for generating air flow for leaking the heat of the CPU 41 to a fin 44, and a 3G antenna 54. The 3G antenna 54 is provided in the upper left portion of the second main unit 12 away from the hinge mechanism 13.

The air flow produced by the fan 45 absorbs the heat of the CPU 41, passes through a heat pipe 43, and reaches an exhaust vent 46 (see FIGS. 2, 17 and 19) formed in an end portion of the housing 12*a* away from the hinge mechanism 13. Through the exhaust vent 46, the air is discharged to the outside of the second main unit 12. Since the exhaust vent 46 is provided away from the hinge mechanism 13, the heated air can be efficiently discharged.

Note that FIG. 19 shows a state in which the touch panel 15*a* and the display panel 15 are detached from the second main unit 12. The touch panel 15*a* and the display panel 15 that are not shown have the same structures and functions as the touch panel 23*a* and the display panel 24 of the first main unit 11, respectively. Therefore, in the description below, the touch panel 15*a* and the display panel 15 incorporated in the second main unit 12 will not be described in detail.

More specifically, as shown in FIGS. 1 and 3, the housing 22 of the first main unit 11 has an opening 21*b* upwardly opening and covered with the touch panel unit 23. The housing 22 has no upper wall except for the peripheral portion thereof close to the second main unit 12. Thus, the upper surface of the first main unit 11 is substantially formed of the upper surface 23*e* of the touch panel unit 23. A substantially constant clearance 21*c* (see FIG. 18) is defined between the touch panel 23 and the edge providing the opening 21*b* along the entire periphery of the touch panel 23.

Further, as shown in FIG. 4, the lower wall of the housing 22 of the first main unit 11 has a recess 21*d* formed therein for receiving a flat rectangular battery pack 17 (see FIGS. 1, 3, 7, 18, etc.). More specifically, the recess 21*d* is provided at the front side of the first main unit 11 away from the hinge mechanism 13. The main unit 11 also includes a pair of release levers 55L and 55R for attaching and detaching the battery pack 17, which are located adjacent to the recess 21*d* and close to the hinge mechanism 13. The release levers 55L and 55R are arranged symmetrically along the X-axis, and therefore look good.

The bottom of the recess 21*d* is formed of a front part of the bottom wall 22*a* of the housing 22. Namely, in the embodiment, the bottom wall 22*a* of the housing 22 serves as a partition between the internal space of the housing 22 for receiving the display panel 24 and the touch panel 23, and the recess for receiving the battery pack 17. The lower surface 24*a* of the display panel 24 is fixed to the bottom wall 22*a* by means of, for example, screws (not shown), as is shown in FIG. 18.

As shown in FIG. 3, the display panel 24 is placed on the upper surface 22*h* of the bottom wall 22*a*. Further, as is shown in FIG. 3, the portion of the lower surface 22*g* of the bottom wall 22*a* shown in FIG. 4, on which the battery pack 17 is placed, projects in front of the hinge mechanism 13. A plurality of (four in this embodiment) rectangular ribs 22*b* are provided on the projected portion of the bottom wall 22*a*. The ribs 22*b* upwardly project from the bottom wall 22*a* and oppose the short side surfaces 24*c* of the display panel 24. In the embodiment, the ribs 22*b* serve as positioning members used when attaching the display panel 24 to the housing 22, and also serve as energy absorbing members for absorbing the energy that occurs when lateral impact is exerted on the display panel 24. In the embodiment, two ribs 22*b* oppose one short side surface 24*c*, and hence four ribs 22*b* in total are provided on the bottom wall 22*a*.

The display panel 24 is placed on the upper surface 22*h* of the bottom wall 22*a* as shown in FIG. 3. Further, as shown in FIG. 3, cylindrical support brackets 22*c* with bottoms, which provide swing support mechanisms 27, project on the portion of the upper surface 22*h* of the bottom wall 22*a* corresponding to the position of the battery pack 17. A plurality of (four in this embodiment) support brackets 22*c* are provided outside the respective ribs 22*b* along the width of the housing 22. Elastic bushes 28 are attached to the respective support brackets 22*c*.

As shown in FIG. 3, the display panel 24 is formed flat and rectangular. The display panel 24 receives display signals from a control circuit formed of, for example, an electronic component (not shown) mounted on a printed circuit board (not shown), and displays still and moving images. In the embodiment, light corresponding to video data displayed on the upper surface 24*b* of the display panel 24 serving as a display screen is emitted to the outside through the transparent touch panel 23*a*. The control circuit of the electronic device 10 comprises a controller, a memory (such as a read only memory (ROM), a random access memory (RAM) and a hard disk drive (HDD)), an interface circuit, various controllers, etc. The electronic device 10 also contains, for example, a loud speaker (not shown) for outputting voice signals.

Figure 5:
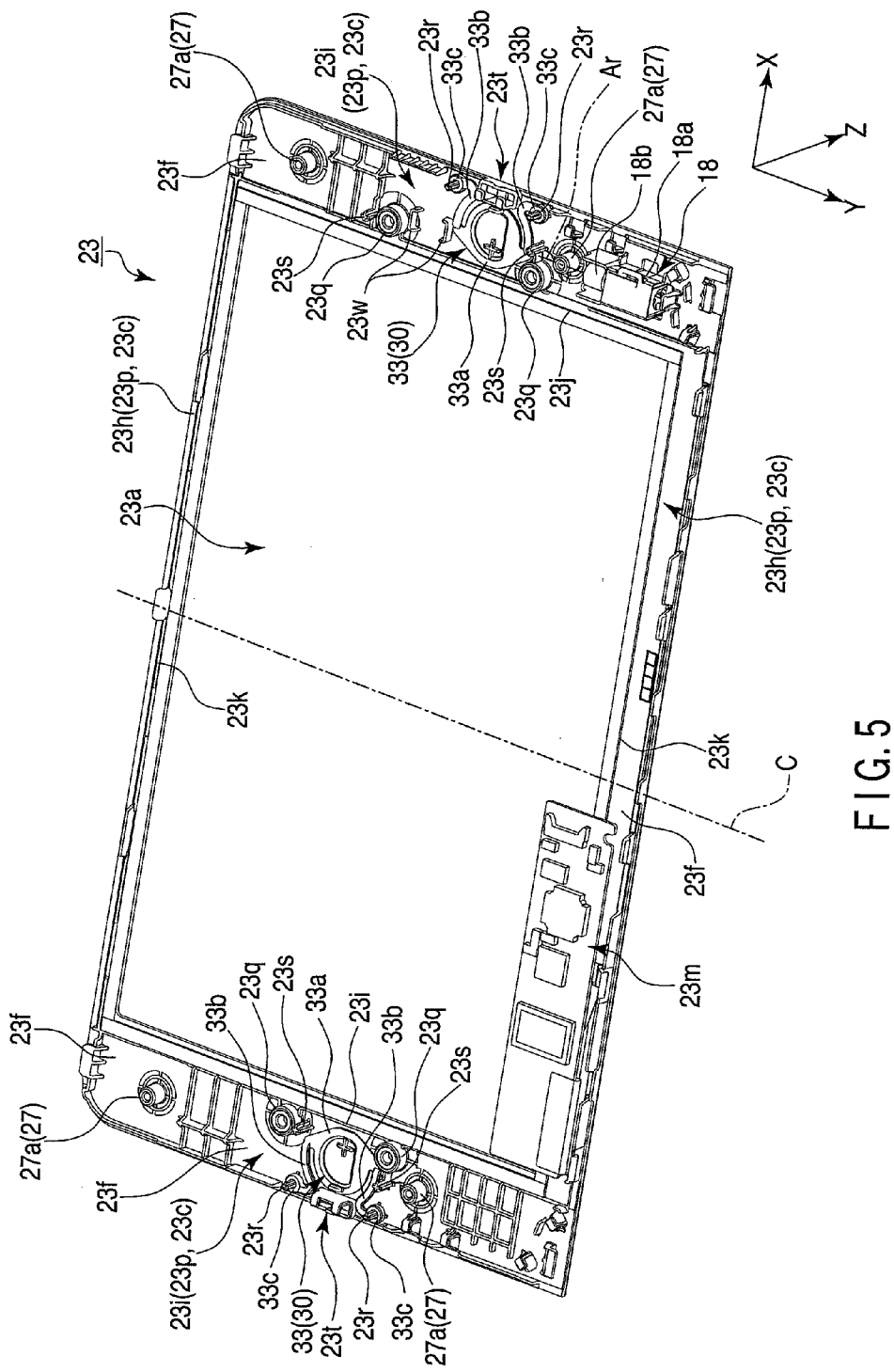
FIG. 5 is a perspective view illustrating the reverse side of a touch panel unit incorporated in the first main unit, from which side operation mechanism support members are detached.

As shown in, for example, FIGS. 3 and 5, the touch panel unit 23 comprises the thin rectangular plate-like touch panel 23a, and a rectangular frame 23c surrounding the touch panel 23a. The frame 23c is formed of a synthetic resin or metal material. As shown in FIG. 18, the touch panel 23a and the frame 23c are adhered to a transparent cover 23d formed of a thin film or plate-like member of a synthetic resin, by means of a double-sided tape (not shown) or an adhesive. By the cover 23d, the touch panel 23a and the frame 23c are formed integral as one body. The periphery 23n of the touch panel 23a is held between the frame 23c and the cover 23d. The periphery of the cover 23d is colored in, for example, black to prevent the periphery 23n of the touch panel 23a and the frame 23c from being seen through the upper surface 23e of the touch panel unit 23.

As shown in FIG. 3, the frame 23c has a wall 23p that is in the shape of a rectangular plate-like frame. Further, as shown in FIG. 5, the wall 23p comprises long-side portions 23h extending along the X-axis, and short-side portions 23i extending along the Y-axis. In the embodiment, coupling portions 27a included in the swing support mechanisms 27 are provided on the lower surfaces 23f of the short-side portions 23i that are wider than the long-side portions 23h. More specifically, two coupling portions 27a are provided on each of the two short-side portions 23i, namely, four coupling portions 27a are provided in total. Thus, the touch panel unit 23 is supported by the four swing support mechanisms 27.

Further, in the embodiment, a vibration mechanism 18 is provided on the lower surface 23f of one of the short-side portions 23i (i.e., the right short-side portion 23i in FIG. 5). Another vibration mechanism 18 is incorporated in the second main unit 12, although it is not shown. In the embodiment, the second main unit 12 incorporates the touch panel 15a. The vibration mechanism 18 is provided to enable a user to easily understand that they touch the touch panel 15a. However, to reduce the manufacturing cost of the electronic device 10, only one vibration mechanism 18 may be provided therein (namely, only the main unit 11 has the vibration mechanism 18).

The vibration mechanism 18 comprises a motor 18a, and an eccentric weight 18b to be rotated by the motor 18a. By rotating the eccentric weight 18b by the motor 18a, the center of gravity of the vibration mechanism 18 is vibrated to thereby vibrate the frame 23c and accordingly the touch panel unit 23. Similarly, the vibration mechanism 18 incorporated in the second main unit 12 effectively vibrates the touch panel 15a.

As shown in FIG. 5, the rotary shaft Ar of the motor 18a of the vibration mechanism 18 incorporated in the first main unit 11 is provided along one short side 23j (i.e., the right short side 23j) of the touch panel 23a. Accordingly, the direction of vibration generated by the vibration mechanism 18 is perpendicular to the short sides 23j, which means that the vibration mechanism 18 can vibrate the touch panel unit 23 along the X-axis. If the vibration mechanism 18 vibrates the touch panel unit 23 along the Y-axis, the X-directional distance (i.e., the moment arm) between each coupling portion 27a as a support of the touch panel unit 23 and the vibration mechanism 18 is large and the X-directional distances between the coupling portions 27a and the vibration mechanism 18 greatly vary, the touch panel unit 23 is liable to swing all over the XY plane. In this case, great variations in vibration may well occur at different positions on the touch panel 23a. In the embodiment, however, the direction of vibration generated by the vibration mechanism 18 is set perpendicular to the short sides 23j, and hence the vibration mechanism 18 vibrates the touch panel unit 23 along the X-axis. Accordingly, the Y-directional distance (i.e., the moment arm) between each coupling portion 27a and the vibration mechanism 18 is small and the Y-directional distances between the coupling portions 27a and the vibration mechanism 18 do not greatly vary. Therefore, the touch panel unit 23 is prevented from swinging all over the XY plane. Namely, the X-directional vibration of the touch panel 23a, which contains less swing components, can easily be obtained.

The eccentric weight 18b of the vibration mechanism 18 is located closer to the center of the short side 23j than the motor 18a. This means that the vibration point of the vibration mechanism 18 is located closer to the center of gravity of the touch panel unit 23, which more efficiently vibrates the touch panel unit 23. Further, the touch panel unit 23 is harder to swing all over the XY plane than when the eccentric weight 18b of the vibration mechanism 18 is located remoter from the center of the short side 23j than the motor 18a. Namely, the X-directional vibration of the touch panel 23a, which contains less swing components, can easily be obtained.

Further, as described above, in the embodiment, the battery pack 17 is located away from the hinge mechanism 13, while the vibration mechanism 18 is located close to the hinge mechanism 13. Thus, in the embodiment, the battery pack 17 and the vibration mechanism 18 do not interfere with each other in the housing 22 of the first main unit 11.

Also, by locating the battery pack 17 away from the hinge mechanism 13, the relatively heavy battery pack 17 can be also used as the fall prevention means of the electronic device 10. For example, when the second main unit 12 is raised from the state shown in FIG. 1 to form an obtuse angle with respect to the first main unit 11 (XY plane), the battery pack 17, which is located away from the hinge mechanism 13, can prevent the second main unit 12 from falling. The battery pack 17 is a rechargeable secondary battery.

Further, as shown in FIG. 5, push button mechanisms 30 as operation mechanisms are provided on the lower surfaces 23f of the short-side portions 23i of the frame 23c. In the embodiment, the push button mechanisms 30 are provided at the respective lengthwise center portions of the short-side portions 23i, and the coupling portions 27a are provided at the opposite ends of each short-side portion 23i with the corresponding push button mechanism 30 interposed therebetween. The cover members 33 and coupling portions 27a (i.e., the swing support mechanisms 27) as moving parts of the push button mechanisms 30 are arranged symmetrical with respect to the above-mentioned center line C of the touch panel unit 23.

A printed circuit board 23m with electronic components for controlling the touch panel 23a is attached to the lower surface 23f of the long-side portion 23h of the frame 23c close to the hinge mechanism 13. The printed circuit board 23m is located near one (i.e., the left one in FIG. 5) of the short-side portions 23i opposite to the short-side portion 23i (i.e., the right one in FIG. 5) provided with the vibration mechanism 18.

As shown in FIGS. 1 and 5, etc., the push button mechanisms 30 are provided on the respective short-side portions 23i. Each of the push button mechanisms 30 is interposed between the corresponding pair of the swing support mechanisms 27.

Figure 7:
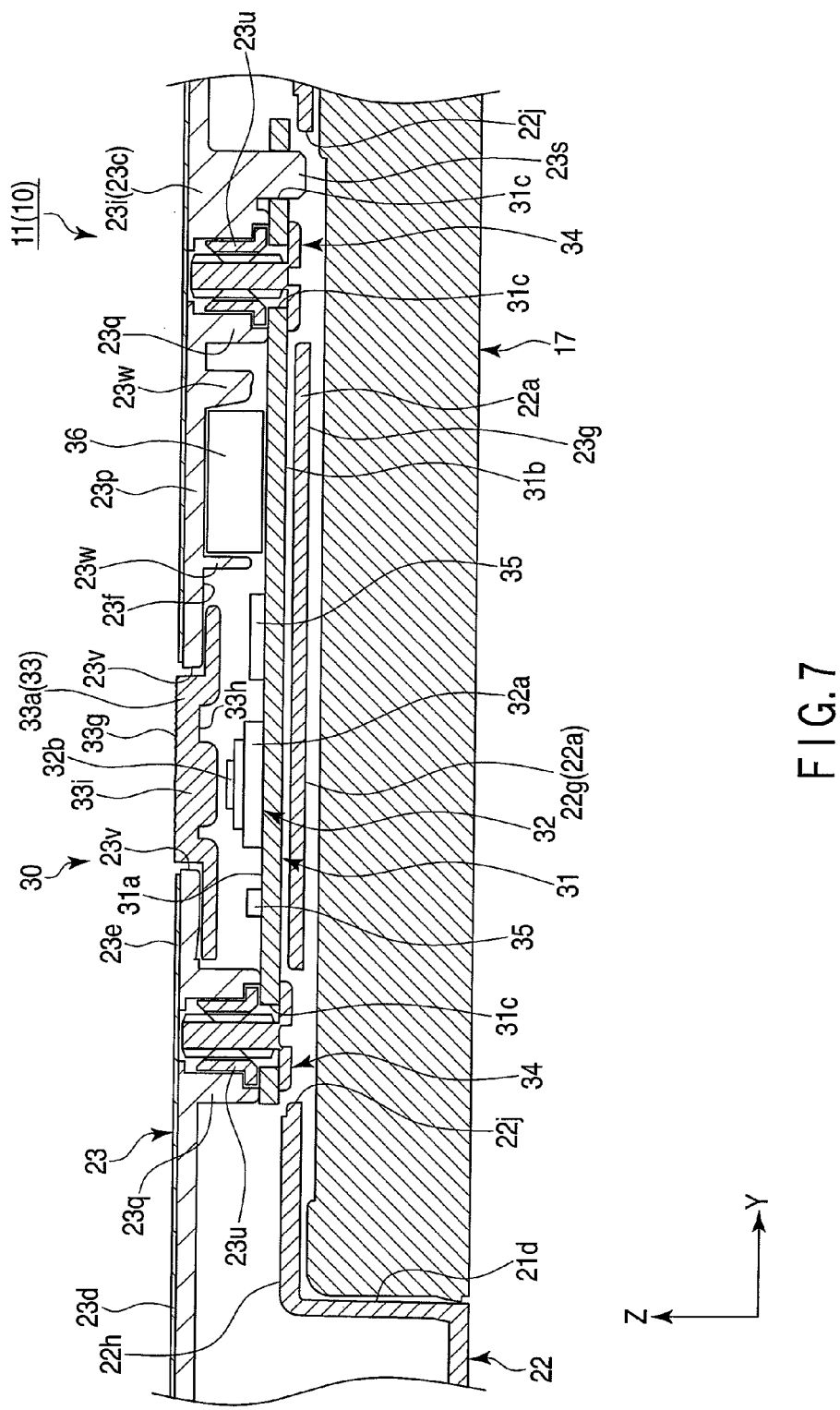
FIG. 7 is a sectional view taken along line VII-VII in FIG. 1.

As shown in FIGS. 7 and 8, etc., the push button mechanisms 30 each comprise a board 31 serving as an operation mechanism support member, a push button switch 32 attached to the board 31, and a cover member 33 covering the push button switch 32.

Figure 6:
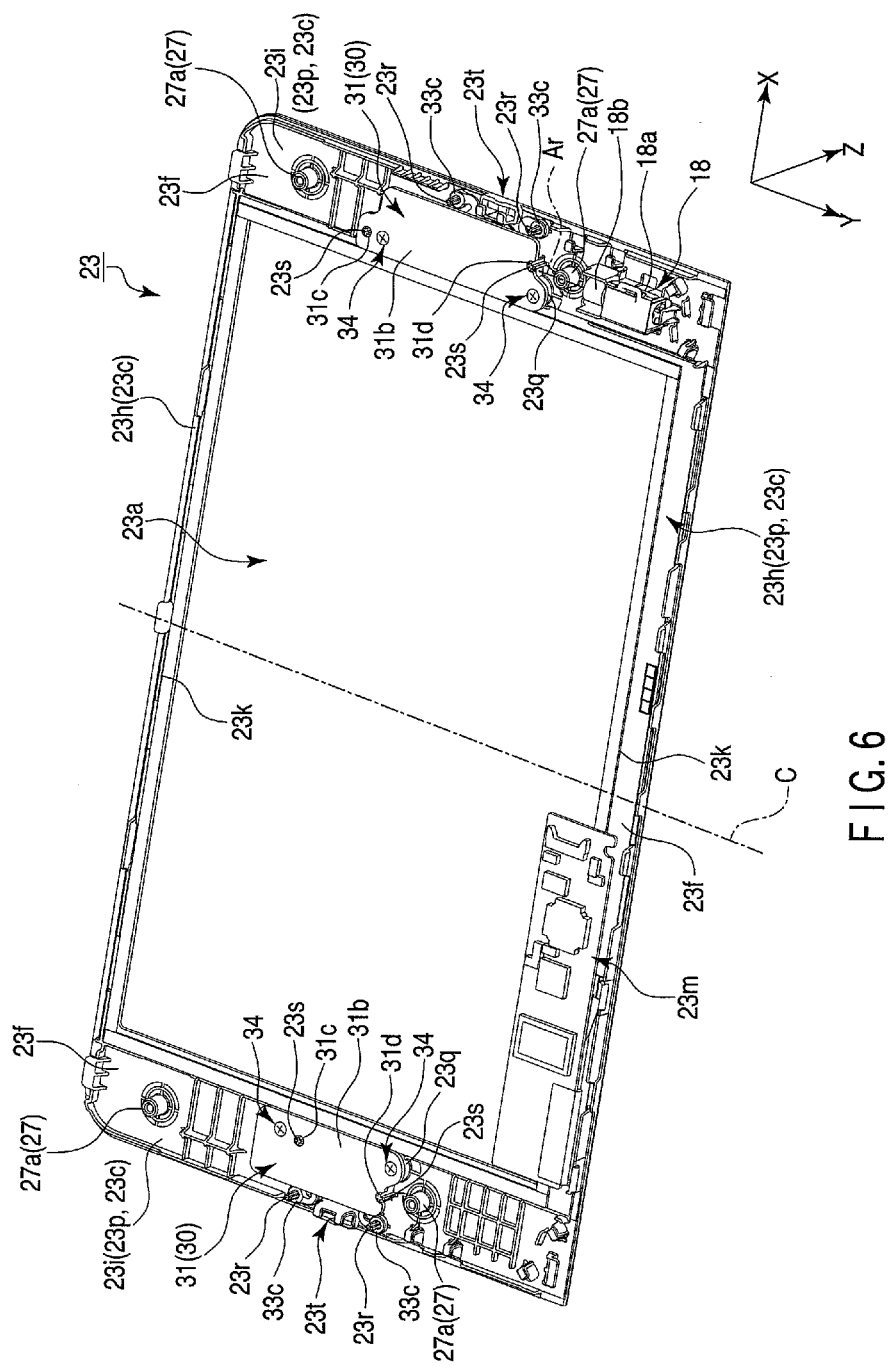
FIG. 6 is a perspective view illustrating a state in which the operation mechanism support members are attached to the structure of FIG. 5.

As shown in FIGS. 6 to 8, the boards 31 are located below and parallel to the wall 23p of the frame 23c, with gaps interposed therebetween.

As shown in FIGS. 5 and 7, etc., the wall 23p of the frame 23c has downwardly projecting bosses 23q serving as support member fixing portions. The bosses 23q are provided at several positions with gaps therebetween along the periphery 23n (see FIG. 8) of the touch panel 23a. (In the embodiment, two bosses are provided for one push button mechanism 30.) The bosses 23q each have a cylindrical female screw member 23u fitted therein by, for example, insert molding. The female screw member 23u is engaged with a screw 34 inserted in a through hole 31c formed in each board 31, thereby fixing the bosses 23q to the boards 31 as shown in, for example, FIG. 6. The wall 23p has downward projections 23s. The projections 23s and the bosses 23q are coupled by means of, for example, ribs.

The boards 31 are each configured as a printed circuit board. As shown in FIG. 9, the upper surface 31a of each board 31 opposing the lower surface 23f of the wall 23p has the push button switch 32, component parts 35, etc., attached thereto by, for example, soldering. The push button switch 32 is connected to a control circuit (not shown) including, for example, a CPU via a patterned wire (not shown) formed on each board 31, a connector 35a as one of the component parts 35 mounted on each board 31, a harness (not shown) connected to the connector 35a, etc. Each board 31 has through holes 31c for inserting the corresponding projection 23s and screw 34, and a notch 31d. The through holes 31c for inserting the corresponding projection 23s and screw 34, and the notch 31d function as positioning means for said each board 31.

As shown in FIGS. 7 and 8, each cover member 33 covers the upper surfaces of the corresponding push button switches 32 with a gap defined therebetween. Each cover member 33 is formed of an elastic material containing elastomer, synthetic resin, etc. As shown in FIGS. 10 and 11(a)~(c), each cover member 33 comprises an operation portion 33a, arm portions 33b and fixing portions 33c. As shown in FIGS. 5 and 6, the lower surface 23f of the wall 23p has projections 23r serving as cover member fixing portions. In a state in which the projections 23r are inserted in the through holes 33d of the fixing portions 33c, the fixing portions 33c are adhered to the projections 23r and the lower surface 23f of the wall 23p, thereby fixing the cover member 33 to the frame 23c. In the embodiment, each of the cover members 33 is fixed to the frame 23c by means of two fixing portions 33c. The two projections 23r corresponding to the two fixing portions 33c are provided with a gap therebetween along the Y-axis of the housing 22, as is shown in FIG. 5. Namely, in the embodiment, each cover member 33 is supported at two points along the Y-axis, and at one point along the X-axis.

The operation portion 33a of each cover member is shaped like a disk. The arm portions 33b extending between the operation portion 33a and the fixed portions 33c each comprises a portion extending from the corresponding fixing portion 33c and an arcuate portion extending along the outer periphery of the corresponding operation portion 33a, these portions being coupled in substantially a V shape. By thus bending the arm portions 33b to increase their length, significant stress is prevented from occurring in the arm portions 33b. It is preferable that the arm portions 33b be formed so that the operation portions 33a will have sufficient rigidity to be kept stationary when no pressing force is exerted on but normal vibration and gravity are exerted on the operation portions 33a.

Each operation portion 33a comprises a ring-shaped thin base 33e, and a cylindrical projection 33f having substantially a D-shaped cross section and projecting from the central portion of the base 33e. A recess is formed in the backside (lower surface) 33h of the projection 33f. Further, a projection 33i opposing a movable portion 32b incorporated in the corresponding push button switch 32, and a projection 33j opposing the upper surface of the corresponding board 31, are provided on the backside 33h of the projection 33f. When each cover member 33 is assembled, the projection 33i opposes the upper surface of the movable portion 32b of the corresponding push button switch 32 with a gap therebetween, as is shown in FIGS. 7 and 8. When a user pushes down each cover member 33 using, for example, their finger, the projection 33i pushes down the movable portion 32b. Further, when the user pushes down each cover member 33 at a position away from the push button switch 32 (e.g., at the right end of the operation portion 33a in FIG. 8), using, for example, their finger, the projection 33i is brought into contact with the upper surface 31a of the board 31 and serves as a support. Namely, in the embodiment, the projection 33i serves as an inclination suppressing portion. As shown in FIG. 11(c), the projection 33i is formed to have a cross-shaped section, which suppresses occurrence of dimple defects when the projection is formed.

As shown in FIGS. 7 and 8, the wall 23p has a through hole 23v. The projection 33f of the operation portion 33a of each cover member 33 is inserted through the through hole 23v and exposed at the upper surface 23e of the touch panel 23. In the embodiment, the top 33g of each operation portion 33a is substantially level with the upper surface 23e of the touch panel 23. When each cover member 33 is pushed down by, for example, a user's finger, it is elastically deformed downwardly, whereby its operation portion 33a is pressed down from the upper surface 233. When the pressing force is released, the operation portion 33a is returned into the initial state.

Referring back to FIG. 5, a plurality of (two in the embodiment) bosses 23q are arranged on each short-side portion 23i along the Y-axis, with the corresponding cover member 33 held therebetween. This structure enables the short-side portions 23i to be more narrowed.

Further, in the embodiment, the bosses 23q are arranged along one side of each short-side portion 23i, while the projections 23r are arranged along the other side of each short-side portion 23i. This enables efficient arrangement of the bosses 23q and the projections 23r on each short-side portion 23i, which enables downsizing of the short-side portions 23i and accordingly the touch panel unit 23.

Furthermore, in the embodiment, the bosses 23q are arranged closer to the touch panel 23a than the projections 23r. This means that the boards 31 are attached to the proximal ends of the short-side portions 23i that are located closer to the touch panel 23a and have higher rigidity, and therefore that the boards 31 and the push button switches 32 can be more reliably supported by the short-side portions 23i.

In the embodiment, as shown in FIGS. 5 and 6, a hooked projection 23t serving as a harness holding member is provided on the lower surface 23f of each short-side portion 23i between the corresponding projections 23r. This suppresses interference between the harnesses and the operation portions 33a and the arm portions 33b of the cover members 33.

As shown in FIG. 7, a magnet 36 is provided as a component attached to the lower surface 23f of the wall 23p, and has its lower portion covered with the board 31. The magnet 36 is a detection target detected by a hole element (not shown) as a magnetic sensor for detecting whether the first and second main units 11 and 12 are open or closed. The hole element is contained in the second main unit 12. The magnet 36 is attached to the lower surface 23f of the wall 23p by means of, for example, adhesion. This structure can suppress the board 31 moving the magnet 36 to another position in the housing 22. Further, a projection 23w for restricting the lateral movement of the magnet 36, and guiding the same when the magnet 36 is attached, is provided on the lower surface 23f of the wall 23p. The magnet 36 may be attached to the board 31.

FIG. 12 is an enlarged view illustrating a part of the left push button mechanism 30 of the first main unit 11 shown in FIG. 1. FIG. 13 is an enlarged view illustrating a part of the right push button mechanism 30 of the first main unit 11 shown in FIG. 1. In the embodiment, the left push button mechanism 30 shown in FIG. 12 is assigned as an operation button 30L for keyboard display, described later, and the right push button mechanism 30 shown in FIG. 13 is assigned as an operation button 30R for returning to the application lastly activated in the electronic device 10.

For instance, the operation button 30L for keyboard display includes the upper portion of the left operation portion 33a exposed at the upper surface 21a of the housing 22 of the first main unit 11. As shown, the exposed upper portion of the left operation portion 33a is not shaped circular, but has a D-shaped cross section obtained by linearly cutting part thereof close to the hinge mechanism 13. Further, a mark M for indicating the type of the operation button 30L is drawn close to the linear line of the upper portion of the left operation portion 33a on the portion of the cover 23d that covers the left portion of the upper surface of the housing 22. The mark M is a simplified figure having, for example, black and white portions.

By thus drawing the "keyboard" mark M adjacent to the operation button 30L, the user can easily recognize the role of the operation button 30L. Thus, the mark M enhances operability and convenience of the device. In particular, the design of the left operation portion 33a of the D-shaped cross section, and the mark M provided along the linear line of the upper portion of the left operation portion 33a enhances the appearance of the entire operation button.

Similarly, as shown in FIG. 13, the right operation button 30R indicating "home" includes the upper portion of the right operation portion 33a exposed at the upper surface 21a of the housing 22 of the first main unit 11. As shown, the exposed upper portion of the right operation portion 33a is not shaped circular, but has a D-shaped cross section obtained by linearly cutting part thereof close to the hinge mechanism 13. Further, a mark M of "house" is drawn for indicating "home."

Further, as mentioned above, the two operation buttons 30R and 30L are provided on the right and left portions of the first main unit 11 symmetrically with respect to the center line C shown in FIG. 5, which provides a balanced good appearance.

In particular, since the exposed upper portions of the right and left operation portions 33a are not shaped circular, but have D-shaped cross sections obtained by linearly cutting part thereof close to the hinge mechanism 13, and since the marks M are drawn close to the right and left operation buttons 30R and 30L, the user can easily recognize the orientations of the operation buttons. In other words, the linear lines of the operation buttons can be used as clues to the recognition of the orientation of the electronic device 10. Since, in particular, the electronic device 10 of the embodiment can be used in a dual mode in which both the first and second main units 11 and 12 display images, it is important to facilitate the recognition of orientation in enhancing the convenience of the device.

FIG. 14 shows an example of a dual-mode screen that displays one image on the display panels 24 and 15 of the first and second main units 11 and 12. In this example, the first main unit 11 is placed on a horizontal plane, such as a disk, and the second main unit 12 is raised toward the user by upwardly rotating the same about the hinge mechanism 13. Namely, FIG. 14 shows a state in which the two display panels 15 and 24 are arranged one above the other.

In this state, the right and left operation buttons 30R and 30L provided on the right and left sides of the display panel 24 of the first main unit 11 have their linear lines positioned upward, and accordingly, the "keyboard" mark M and the "home" mark M are seen as shown in FIGS. 12 and 13. By virtue of the designs of the two operation buttons 30R and 30L, the user can easily determine the orientation of the electronic device 10, and hence easily set the electronic device 10 in the attitude shown in FIG. 14.

Further, in the embodiment, when the user holds, by their hands, the right and left ends of the first main unit 11 of the electronic device 10 of the attitude shown in FIG. 14, and presses the operation portions 33a of the operation buttons 30R and 30L, both thumps are used to press the operation portions 33a. At this time, since the operation portions 33a have D-shaped cross sections obtained by linearly cutting part thereof close to the hinge mechanism 13, namely, since the portions of the thumps, which are brought into contact with the operation potions 33a, have similar cross sections, the user can have comfortable click feeling.

When the user clicks the operation button 30L for keyboard display in the state shown in FIG. 14, the image displayed on the display panel 24 of the first main unit 11 is switched to such an image of a keyboard as shown in FIG. 15. In contrast, when the user again clicks the operation button 30L, the image of the display panel 24 is returned to that shown in FIG. 14.

Further, when the keyboard image is displayed on the display panel 24 as shown in FIG. 15, if the user touches a button image of the keyboard image, a key input operation is executed. Namely, in this state, the electronic device 10 functions as a so-called note PC. It is a matter of course that the key input operation enables, for example, editing of an image of, for example, characters, displayed on the display panel 15 of the second main unit 12. Although in FIG. 15, the keyboard is displayed on the whole display panel 24, it can also be displayed, reduced in size, along with other images.

As described above, when the device is used with the two screens arranged one above the other, the operation button 30L for keyboard display is positioned opposite to the dominant hand (in general, the right hand) of the user. Accordingly, immediately after the left hand clicks the operation button 30L, the right hand, which is now free, can be used to touch the touch panel 23a of the display panel 24. Thus, an operation input via the displayed keyboard image can be instantly executed, and the operability of the device is enhanced.

Furthermore, when the user double-clicks the operation button 30L in the dual mode shown in FIG. 14, the image on the display panel 24 of the first main unit 11 is switched to the mouse pad image shown in FIG. 16. Similarly, when the user double-clicks the operation button 30L in the mode shown in FIG. 16, the mode is returned to the dual mode of FIG. 14.

As described above, since the operation button 30L for displaying a keyboard image or mouse pad image is located at the left position corresponding to the left hand of the user, the user can start a keyboard input operation (or a mouse pad operation) immediately after pressing the operation button 30L. Namely, since the dominant hands of most people are right hands, the operation button 30L at the left position is advantageous in enhancing the operability of the device.

In addition, as another way of use of the dual mode, the display panels 24 and 14 of the first and second main units 11 and 12 may be arranged side by side. FIG. 17 shows an example in which the user holds the first and second main units 11 and 12 by the left and right hands, respectively. In FIG. 17, the holding portion of the first main unit 11 is indicated by the broken line L, and the holding portion of the second main unit 12 is indicated by the broken line R. As an example of this use, the electronic device can be used as an electronic book.

Note that when the electronic device 10 of the embodiment is used with the two screens arranged side by side, normal image display can be realized only if the attitude shown in FIG. 17 is assumed, namely, only if the first main unit 11 is held by the left hand and the second main unit 12 is held by the right hand. In other words, if the electronic device assumes an attitude upside down with respect to that shown in FIG. 17, upside-down images are displayed on the two screens, and hence the electronic device cannot be correctly used. Therefore, when the user uses the electronic device 10 as shown in FIG. 17, they rotate the electronic device 10 clockwise through 90 degrees.

When the electronic device is used with the two screens (display panels) arranged side by side as shown in FIG. 17, i.e., when the portion of the first main unit 11 indicated by the broken line L is held by the left hand, and the portion of the second main unit 12 indicated by the broken line R is held by the right hand, the operation button 30L for keyboard display is positioned at the upper left position. However, when the electronic device is used with the two screens positioned side by side, the possibility of the use of the keyboard is extremely weak. Because of this, it is advantageous to locate the operation button 30L as shown in the figures in light of the fact that this location is convenient when the two screens are arranged one above the other as shown in FIGS. 14 to 16.

Further, in the embodiment, the power button 16 is located as shown in, for example, FIGS. 1, 14 and 17. When the electronic device 10 is closed as shown in FIG. 2, the power button 16 is facing the right operation button 30R of the first main unit 11. Furthermore, the camera lens 19 is arranged symmetrical with the power button 16 with respect to the center line C shown in FIGS. 5 and 6. In other words, in the embodiment, the camera lens 19 is facing the left operation button 30L of the first main unit 11 when the electronic device 10 is closed as shown in FIG. 2.

Since the power button 16 and the camera lens 19 are arranged at the aforementioned positions, various types of buttons (including the camera lens 19) are arranged symmetrical on the upper surfaces of the electronic device 10, which enhances the appearance. When, for example, the two screens are arranged one above the other as shown in FIGS. 14 to 16, the power button 16 and the camera lens 19 are symmetrical with respect to the center line C shown in FIGS. 5 and 6. Further, when the two screens are arranged side by side as shown in FIG. 17, the operation button 30R and the power button 16 are arranged symmetrical with respect to the hinge mechanism 13, and the operation button 30L and the camera lens 19 are arranged symmetrical with respect to the hinge mechanism 13.

Regarding the position of the power button 16, when the two screens are arranged one above the other as shown in FIGS. 14 to 16, the power button 16 is positioned on the upper right side of the device. Further, when the two screens are arranged side by side as shown in FIG. 17, the power button 16 is positioned on the lower right side of the user. In any case, the layout, on the two screens, of elements including the power button 16, employed in the embodiment, is advantageous to turn on/off the power, since the dominant hands of most people are right hands.

Further, in the embodiment, the two operation buttons 30R and 30L are arranged on the opposite short-side portions 23i of the first main unit 11, and the power button 16 and the camera lens 19 are arranged on the surface 12b of the second main unit 12 at the positions corresponding to the two operation buttons 30R and 30L, respectively. Accordingly, when the first and second main units 11 and 12 are open as shown in FIG. 1, the electronic device 10 can be formed substantially square as a whole, which enhances the appearance.

Namely, the above-mentioned button layout makes it unnecessary to secure spaces for the two operation buttons 30R and 30L, the power button 16 and the camera lens 19 on the long-side portions 23h of the first main unit 11 away from the hinge mechanism 13, or on the portions of the second main unit 12 away from the hinge mechanism 13. As a result, the length of the electronic device 10 along the Y-axis can be shortened, which enables the electronic device 10 to be seen substantially square when the two housings 22 and 12a are open as shown in FIGS. 1.

Also in the embodiment, the battery pack 17 is received in the recess 21d formed in the lower (back) surface of the housing 22 of the first main unit 11, and the system board 40 is received in the housing 12a of the second main unit 12. Therefore, the first and second main units 11 and 12 can be formed to substantially the same weight, compared to, for example, the case where the battery pack 17 and the system board 40 are received in the first main unit 11. Namely, when the user holds the two screens arranged side by side, the right and left hands of the user will receive substantially the same weight, which means that the electronic device 10 can be easily carried and operated.

Further, since the battery pack 17 is housed in the first main unit 11, and the system board 40 is housed in the second main unit 12, the components parts, other than the display panels and touch panels, can be substantially evenly housed in the housings 22 and 12a of the first and second main units 11 and 12, thereby making the thickness of the first main unit 11 be equal to that of the second main unit 12. As a result, when the electronic device 10 is placed, with the first and second main units 11 and 12 kept open and with the back sides of the housings 22 and 12a kept contact with a flat surface, such as a desk top, the display panels 24 and 15 (accordingly, the touch panels 23a and 15a) are arranged level with each other. This enhances the appearance.

Also since the battery pack 17 is housed in the first main unit 11, and the system board 40 is housed in the second main unit 12, the battery pack 17 can be made sufficiently large and thick. Namely, this structure enables the battery pack 17 to have a sufficiently large capacity, and therefore the operation period of the electronic device 10 to be lengthened.

In the embodiment, a 3G antenna 54 is located near the end portion of the second main unit 12 away from the hinge mechanism 13. More specifically, the antenna 54 is positioned at the upper left portion of the housing 12a when the two housings 12a and 22 are open, as is shown in FIG. 1. Accordingly, when the two screens are arranged one above the other as shown in FIGS. 14 to 16, the antenna 54 is positioned away from the user, with the result that the SAR regulations can be dealt with. Also when the electronic device 10 is used with the two screens set side by side as shown in FIG. 17, the 3G antenna 54 is positioned at the upper right portion of the housing 12a, i.e., away from the user. In other words, in the embodiment, the 3G antenna 54 is positioned away from the user, regardless of the attitude of the electronic device 10.

In addition, in the embodiment, release levers 55R and 55L incorporated in the battery pack 17 are provided symmetrical with respect to the aforementioned center line C as shown in FIG. 4. One of the release levers 55R and 55L is of a lock type, and the other is of a slide type. Namely, the battery pack 17 can be detached by sliding the other release lever with the one release lever kept unlocked. Since the two release levers 55R and 55L are arranged symmetrical, even force can be exerted thereon and therefore the operability of the device can be enhanced. The symmetrical arrangement of the two levers also enhances the appearance.

The electronic device 10 of the embodiment has the swing support mechanisms 27. As shown in FIG. 18, each swing support mechanism 27 comprises the support bracket 22c provided on the housing 22, an elastic bush 28 attached to the support bracket 22c, a coupling portion 27a inserted through a through hole 28a formed in the elastic bush 28, and a screw 29 as an engagement member to be engaged with the coupling portion 27a.

The support bracket 22c is provided on a peripheral portion of the bottom 22a of the housing 22, serving as a cylindrical boss projecting to the wall 23p as a to-be-supported portion. A circular through hole 22e is formed in the center portion of the top wall 22d of the support bracket 22c, and an inwardly extending flange 22f is formed around the through hole 22e.

The elastic bush 28 is formed cylindrical and made of an elastic material such as an elastomer (e.g., a synthetic resin), and has an annular groove 28c formed in the axial center portion of the periphery 28b of the bush 28. The elastic bush 28 is attached to the bracket 22c by engaging the annular groove 28c of the bush 28 with the flange 22f of the bracket 22c.

Since the elastic bush 28 is elastically deformable, it can be easily inserted into the through hole 22e from above. Thus, the elastic bush 28 can be relatively easily attached to the support bracket 22c. The elastic bush 28 is formed asymmetrical at axially opposite ends, which suppresses erroneous attachment of the elastic bush 28 to the support bracket 22c. Further, as shown in FIG. 18, the elastic bush 28 has slopes 28d and 28e. The elastic bush 28 also has an upper expanded portion 28f held between the frame 23c and the flange 22f, and a lower expanded portion 28g held between the head 29a of the screw 29 and the flange 22f.

The coupling portion 27a is formed as a cylindrical boss projecting downwardly from the frame 23c. As shown in FIG. 18, in a state in which the device is assembled, the coupling portion 27a projects through the through hole 22e of the support bracket 22c to the backside of the support bracket 22c. The coupling portion 27a has a female screw hole 27b as a female screw portion opening downward.

The screw 29 includes a head portion 29a, and a male screw portion 29b screwed into the female hole 27b. The screw 29 is screwed into the female screw hole until the head portion 29a contacts the end face 27c of the coupling portion 27a.

The swing support mechanism 27 shown in FIG. 18 is formed by fitting the elastic bushes 28 into the support brackets 22c from above, then bringing the touch panel unit 23 close to the housing 22 from above to thereby insert the coupling portions 27a into the through holes 28a of the elastic bushes 28, and fastening the screws 29 into the female screw holes 27b of the coupling portions 27a from the backside. Since the elastic bushes 28 are thus fitted into the bracket portions 22c, the assembling work can be more easily and smoothly carried out than in the case of adhering or screwing elastic members.

In the embodiment, the coupling portions 27a are inserted through the through holes 28a of the elastic bushes 28 along the width of the display panel 24. Further, in a state in which the swing support mechanisms 27 are assembled, the upper expanded portions 28f of the elastic bushes 28 are interposed between the support brackets 22c as part of the housing 22 and the frame 23c of the touch panel unit 23, and the lower expanded portions 28g of the elastic bushes 28 are interposed between the support brackets 22c and the screws 29. Further, the elastic bushes 28 surround the coupling portions 27a. The support brackets 22c are formed as bosses upwardly projecting from the bottom 22a of the housing 22 (namely, projecting toward the wall 23p of the frame 23c).

An annular projection 28h is provided on the inner surface of the through hole 28a of each elastic bush 28, and a plurality of projections 23g are circumferentially provided on the lower surfaces 23f of the frame 23c opposing the elastic bushes 28. These projections 28h and 23g serve as a structure for reducing the contact area between each elastic bush 28 and the touch panel unit 23 assumed when the device is assembled. These arrangements are just examples. Alternatively, for instance, projections may be provided on the coupling portions 27a, or on the upper surfaces of the elastic bushes 28. Further, a single annular projection may be provided, or a plurality of projections be provided circumferentially.

Further, in the embodiment, as shown in FIG. 4, the screws 29 incorporated in the swing support mechanisms 27, and the screws 34 incorporated in the push button mechanisms 30, and the projections 23r are exposed at the lower surface 22g of the bottom 22a. Namely, before the screws 29 and 34 are fastened, the end faces 27c (see FIG. 18) of the coupling portions 27a providing the swing support mechanisms 27 are exposed at the lower surface 22g of the bottom 22a, and the bosses 23q and the projections 23r are exposed at the lower surface 22g through the through holes 22j formed in the bottom 22a. Accordingly, when the screws 29 and 34 are fastened with the battery pack 17 detached from the recess 21d, the swing support mechanisms 27 and the push button mechanisms 30 can be more easily and smoothly assembled, and hence the touch panel unit 23 can be more easily attached to the housing 22. Further, since the screws 29 and 34 can be fastened simultaneously, the assemblage efficiency can be more enhanced. Furthermore, since the battery pack 17 lastly covers the screws 29 and 34, these screws are prevented from being erroneously detached to thereby prevent unintentional detachment of the touch panel unit 23 and the push button mechanisms 30 from the housing 22. As a result, a simpler structure can be realized than in the case where a cover dedicated to the screws 29 and 34 is employed. Alternatively, a seal 22i as an example of the cover may be provided to cover the screws 29 and 34, as is shown in FIG. 18. The embodiment is also advantageous in that the housing 22 can be made thin since the battery pack 17 itself is used as a lid for the recess 21d. The user can confirm the attachment state of the board 31 by exposing the positioning projections 23r through the through holes 22j.

As described above, the electronic device 10 of the embodiment can be also used in a state (as shown in, for example, FIG. 17) assumed by clockwise rotating the device through 90° from the state of FIG. 1 in which the first and second main units 11 and 12 are open. In this case, the electronic device 10 can be functioned as, for example, an electronic book. Further, in this case, the user holds the long-side portion 23h of the first main unit 11 (indicated by the broken line L) by the left hand, and holds the long-side portion of the second main unit 12 (indicated by the broken line R) by the right hand.

In this state, the operation button 30R for "home" incorporated in the first main unit 11 is positioned lower left to the user, and the power button 16 incorporated in the second main unit 12 is positioned lower right to the user. Namely, where the two screens are arranged side by side, the user can easily operate the operation button R by the left hand, and the power button 16 by the right hand. In this state, the operation button 30L for keyboard display is positioned upper left to the user. This involves no problem since the possibility of using the keyboard is weak when the user uses the electronic device 10 as an electronic book.

The electronic device 10 of the embodiment also comprises, at the sides of the first main unit 11, a power supply connector 51 to be connected to the plug of an AC adaptor (not shown), a USB port 52 to be connected to an external device, and a headphone jack 53. The power supply connector 51 is provided at, for example, the right side of the first main unit 11 close to the hinge mechanism 13 of the housing 22 as shown in FIG. 1. By providing the power supply connector 51 at this position, a power supply cord (not shown) downwardly stretches from the hands of the user when the electronic device 10 is used with the two screens arranged side by side. Thus, the cord does not interfere with the operation of the device by the user, thereby enhancing the operability of the device.

As shown in, for example, FIGS. 4 and 17, the headphone jack 53 is provided at the side opposite to the above-mentioned power supply connector 51, namely, provided at the left side close to the hinge mechanism 13 of the housing 22 of the first main unit 11. Since thus the power supply connector 51 and the headphone jack 53 are arranged symmetrical at the opposite sides of the housing 22, they provide a good balanced appearance. The USB port 52 is located adjacent to the headphone jack 53 slightly away from the hinge mechanism 13 as shown in FIGS. 4 and 17.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Although the above-described embodiment is directed to a note PC having two display screens, the invention is not limited to this. The invention is also applicable to other types of electronic devices having a display panel and a front panel opposite thereto, such as a PC having one display screen (a note PC or a desk top PC), a personal digital assistant (PDA), a smart book, a smart phone, and a portable phone terminal. The invention is further applicable to devices incorporating, for example, an ARM processor that does not have a PC architecture.

What is claimed is:
1. An electronic device comprising:
a first display comprising a first screen;
a first housing comprising the first display;
a second display comprising a second screen;
a second housing comprising the second display;
a hinge mechanism coupling the first and second housings wherein the first and second housings are rotatable between a closed position at which the first and second screens are facing each other, and an open position at which the first and second screens are in side-by-side arrangement;
two operation buttons incorporated in the first housing and arranged symmetrical with respect to a center line extending in a direction of the side-by-side arrangement of the first and second screens;
a power button incorporated in the second housing at a position at which the power button is facing one of the two operation buttons when the first and second screens are at the closed position; and
a cover comprising a first projection configured to press a switch and a second projection closer to fixing portions than the first projection.

2. The electronic device of claim 1, wherein the first housing comprises a battery, and the second housing comprises a circuit board.

3. The electronic device of claim 1, further comprising a first touch panel provided on the first screen, and a second touch panel provided on the second screen.

4. The electronic device of claim 1, wherein the hinge mechanism is a biaxial hinge coupling the first and second housings.

5. An electronic device comprising:
a first display comprising a first screen;
a first housing comprising the first display;
a second display comprising a second screen;
a second housing comprising the second display;
a hinge mechanism coupling the first and second housings wherein the first and second housings are rotatable between a closed position at which the first and second screens are facing each other, and an open position at which the first and second screens are in side-by-side arrangement;
two operation buttons incorporated in the first housing and arranged symmetrical with respect to a center line extending in a direction of the side-by-side arrangement of the first and second screens;
a camera lens incorporated in the second housing at a position at which the camera lens is facing one of the two operation buttons when the first and second screens are at the closed position; and
a cover comprising a first projection configured to press a switch and a second projection closer to fixing portions than the first projection.

6. The electronic device of claim 5, wherein:
said one of the two operation buttons comprises the cover in the first housing and the switch configured to be pressed through the cover; and
when the first and second screens are at the closed position, the camera lens faces the cover and is eccentric to the switch.

7. The electronic device of claim 6, wherein the cover has a D-shaped section.

8. The electronic device of claim 6, further comprising a frame covering the first display, wherein the frame comprises an opening configured to expose the cover.

9. The electronic device of claim 6, wherein the cover comprises arms extending away from the center line and is configured to be supported by the first housing through the arms.

10. The electronic device of claim 9, wherein:
ends of the arms away from the center line are fixed to the first housing through the fixing portions; and the switch is closer to the center line than the fixing portions in an area covered by the cover.

11. The electronic device of claim 10, wherein a component is provided between the first and second projections.

12. An electronic device comprising:
a first display comprising a first screen;
a first housing comprising the first display;
a second display comprising a second screen;
a second housing comprising the second display;
a hinge mechanism coupling the first and second housings wherein the first and second housings are rotatable between a closed position at which the first and second screens are facing each other, and an open position at which the first and second screens are in side-by-side arrangement;
two operation buttons incorporated in the first housing and arranged symmetrical with respect to a center line extending in a direction of the side-by-side arrangement of the first and second screens; and
a power button incorporated in the second housing at a position at which the power button is facing one of the two operation buttons when the first and second screens are at the closed position,
wherein said one of the two operation buttons comprises a cover in the first housing and a switch configured to be pressed through the cover,
when the first and second screens are at the closed position, a camera lens faces the cover and is eccentric to the switch,
the cover comprises arms extending away from the center line and is configured to be supported by the first housing through the arms,
ends of the arms away from the center line are fixed to the first housing through fixing portions,
the switch is closer to the center line than the fixing portions in an area covered by the cover, and
the cover comprises a first projection configured to press the switch and a second projection closer to the fixing portions than the first projection.

13. An electronic device comprising:
a first display comprising a first screen;
a first housing comprising the first display;
a second display comprising a second screen;
a second housing comprising the second display;
a hinge mechanism coupling the first and second housings wherein the first and second housings are rotatable between a closed position at which the first and second screens are facing each other, and an open position at which the first and second screens are in side-by-side arrangement;
two operation buttons incorporated in the first housing and arranged symmetrical with respect to a center line extending in a direction of the side-by-side arrangement of the first and second screens; and
a camera lens incorporated in the second housing at a position at which the camera lens is facing one of the two operation buttons when the first and second screens are at the closed position,
wherein said one of the two operation buttons comprises a cover in the first housing and a switch configured to be pressed through the cover,
when the first and second screens are at the closed position, the camera lens faces the cover and is eccentric to the switch,
the cover comprises arms extending away from the center line and is configured to be supported by the first housing through the arms,
ends of the arms away from the center line are fixed to the first housing through fixing portions,
the switch is closer to the center line than the fixing portions in an area covered by the cover, and
the cover comprises a first projection configured to press the switch and a second projection closer to the fixing portions than the first projection.

* * * * *